US008801278B2

(12) United States Patent
Mogari et al.

(10) Patent No.: US 8,801,278 B2
(45) Date of Patent: Aug. 12, 2014

(54) TEMPERATURE SENSOR HAVING A FLOW PATH FOR A BRAZING FILLER TO FLOW BETWEEN AN OUTER SURFACE OF THE TUBE AND AN INNER SURFACE OF THE MOUNTING STRUCTURE

(75) Inventors: Satoshi Mogari, Komaki (JP); Masamichi Ito, Iwakura (JP); Satoshi Ishikawa, Kani (JP)

(73) Assignee: NGK Spark Plug Co., Ltd., Aichi (JP)

( * ) Notice: Subject to any disclaimer, the term of this patent is extended or adjusted under 35 U.S.C. 154(b) by 192 days.

(21) Appl. No.: 13/476,374

(22) Filed: May 21, 2012

(65) Prior Publication Data

US 2012/0294331 A1    Nov. 22, 2012

(30) Foreign Application Priority Data

May 19, 2011   (JP) ................................. 2011-112250
Jan. 24, 2012   (JP) ................................. 2012-012367

(51) Int. Cl.
*G01K 13/02* (2006.01)
*G01K 1/14* (2006.01)

(52) U.S. Cl.
USPC ......................................................... 374/144

(58) Field of Classification Search
CPC ......... G01K 13/002; G01K 7/01; G01K 1/14; G01K 1/024; G01K 1/16; G01K 7/42; G01K 1/08; G01K 7/20; G01K 1/206; G01K 7/22; G01K 7/16; G01K 7/183; G01K 13/02; G01K 1/143; H01F 27/402
See application file for complete search history.

(56) References Cited

U.S. PATENT DOCUMENTS

| | | | | |
|---|---|---|---|---|
| 4,162,929 | A * | 7/1979 | Finney | 136/233 |
| 6,059,453 | A * | 5/2000 | Kempf et al. | 374/179 |
| 6,485,175 | B1 * | 11/2002 | Nimberger et al. | 374/142 |
| 6,520,022 | B1 * | 2/2003 | Anderson et al. | 73/756 |
| 6,631,740 | B1 * | 10/2003 | Jackson et al. | 138/109 |

(Continued)

FOREIGN PATENT DOCUMENTS

| | | | |
|---|---|---|---|
| CN | 201322634 Y | * | 10/2009 |
| JP | 59-190468 U | | 12/1984 |

(Continued)

OTHER PUBLICATIONS

Fukaya et al., JP_07140012_A, (Jun. 1995), Japan, (English language translation), 9 pages.*

(Continued)

*Primary Examiner* — Lisa Caputo
*Assistant Examiner* — Gregory A Royal
(74) *Attorney, Agent, or Firm* — Sughrue Mion, PLLC

(57) ABSTRACT

A sensor including a tube having a small-diameter portion loosely inserted into a tube insertion hole of an annular mounting fixture and a large-diameter portion having a diameter larger than an inside diameter of the tube insertion hole. A flow path is formed, so that when the large-diameter portion of the tube is locked on the rear end of the tube insertion hole, a rear end of a gap, defined between an inner circumferential surface of the tube insertion hole and an outer circumferential surface of the small-diameter portion of the tube, remains open. Further, the inner circumferential surface of the tube insertion hole and the outer circumferential surface of the small-diameter tubular portion of the tube are brazed together with a brazing filler which flows into the gap.

8 Claims, 17 Drawing Sheets

(56) References Cited

U.S. PATENT DOCUMENTS

| | | | |
|---|---|---|---|
| 6,997,607 B2* | 2/2006 | Iwaya et al. | 374/208 |
| 7,165,883 B2* | 1/2007 | Nimberger et al. | 374/148 |
| 8,668,385 B2* | 3/2014 | Matsuo et al. | 374/208 |
| 2004/0101028 A1* | 5/2004 | Iwaya et al. | 374/163 |
| 2006/0176931 A1* | 8/2006 | Miyahara et al. | 374/208 |
| 2008/0304540 A1* | 12/2008 | Danley | 374/11 |
| 2011/0135421 A1* | 6/2011 | Chiu | 411/167 |

FOREIGN PATENT DOCUMENTS

| | | | |
|---|---|---|---|
| JP | 62-278421 A | | 12/1987 |
| JP | 07140012 A | * | 6/1995 |
| JP | 2002-103030 A | | 4/2002 |
| JP | 2004333203 A | * | 11/2004 |
| JP | 2009300237 A | * | 12/2009 |

OTHER PUBLICATIONS

Toyama, Isamu, JP_2002103030_A, (Apr. 2002), Japan, (English language translation), 20 pages.*

Fukuma, Zenichi, JP_59190468_U, (Dec. 1984), Japan, (English language translation), 9 pages.*

Notification of Reasons of Refusal, dated Mar. 11, 2014, issued by the Japanese Patent Office in counterpart Japanese Application No. 2012-012367.

* cited by examiner

SECTIONAL VIEW TAKEN ALONG LINE S1-S1

SECTIONAL VIEW TAKEN ALONG LINE S2-S2

SECTIONAL VIEW TAKEN ALONG LINE S3-S3
WITH ANNULAR MOUNTING FIXTURE OMITTED

TEMPERATURE SENSOR HAVING A FLOW PATH FOR A BRAZING FILLER TO FLOW BETWEEN AN OUTER SURFACE OF THE TUBE AND AN INNER SURFACE OF THE MOUNTING STRUCTURE

BACKGROUND OF THE INVENTION

1. Field of the Invention

The present invention relates to a sensor for measuring the temperature of a fluid such as an exhaust gas of an engine, and more particularly, to a sensor in which a sensor element such as a thermistor (hereinafter, referred to as a sensor element or simply an element) is disposed in an interior of a tube which is closed at a front end thereof (a bottomed tube or a cap) at a location lying at or close to the front end of the tube. The sensor is mounted at a mounting target location such as an exhaust manifold (an exhaust pipe) such that a location lying close to the front end of the tube is exposed to heat of the exhaust gas. In this manner, the heat is conducted to the sensor element to suitably measure (detect) a temperature of the exhaust gas.

2. Description of the Related Art

Conventionally, sensors having various constructions have been proposed as sensors of this type (temperature sensors). Patent Literature 1 discloses a sensor in which a hollow bolt-like (annular or cylindrical) annular mounting fixture, which has a mounting portion (thread) formed on an outer circumferential surface thereof, is fixedly fitted on a tube (metallic case) housing a sensor element in order to mount the sensor at a mounting target location. This sensor is screwed into a threaded hole which is provided in the mounting target location for use in measuring the temperature of an exhaust gas.

In the above-described sensor, an inner circumferential surface of a tube insertion hole (a central through hole) formed inside the annular mounting fixture and an outer circumferential surface of the tube need to be fixed (connected) together structurally. In addition, a gastight seal is needed in a front-to-rear direction between the inner and outer circumferential surfaces. As a conventional sealing means, a tube is inserted into a tube insertion hole in an annular mounting fixture in a loose-fit fashion. Then, a molten brazing filler (Ni brazing filler or copper brazing filler) is caused to flow into a gap defined between an inner circumferential surface of the tube insertion hole and an outer circumferential surface of the tube so as to set and establish gastightness therebetween.

On the other hand, in a sensor of this type, in fixing together the annular mounting fixture and the tube by means of brazing with the tube inserted in the annular mounting fixture, from the viewpoint of positioning accuracy or detection accuracy that is taken into account when mounting the sensor at the mounting target location such as the exhaust manifold, high dimensional accuracy is required for a forward projection amount of the tube which projects from the annular mounting fixture. In particular, the tube needs to be mounted so that a dimension from the tip or front end of the tube to a predetermined position on the annular mounting fixture (or a projecting length from a tip or front end of the fixture) becomes highly accurate. On the other hand, in brazing together the inner circumferential surface of the tube insertion hole (the central through hole) in the annular mounting fixture and the outer circumferential surface of the tube which is inserted in the inner circumferential surface to which the tube is fixed through brazing, a molten brazing filler is caused to flow into the gap between the two members (the inner and outer circumferential surfaces thereof) by making use of capillary action, etc., so as to set (solidify) therein. The specific method used is as follows.

As shown in FIG. 19, an annular mounting fixture 31 is supported at a location on an outer circumference of the annular mounting fixture 31 which constitutes a tip or front end-facing surface (for example, a tip or front end-facing surface of a screwing tool engagement portion (a polygonal portion 34) by a support portion 215 of a support (holding) jig 211 which is provided on an upper surface 201 of a positioning table. Then, a tube 11 is inserted into a tube insertion hole 32 in the annular mounting fixture 31 from above with a tip or front end 12 of the tube 11 oriented downwards to contact the upper surface 201. By so doing, in a front-to-rear (longitudinal) direction of the tube 11, the tube 11 is positioned so that a dimension L1 from the front end 12 to a predetermined position on the annular mounting fixture 31 is held at a predetermined dimensional accuracy. Following this, with the tube 11 so positioned, a brazing filler material 220 in the form of a foil or ring is disposed in or near to a corner defined by an outer circumferential surface of the tube 11 and a rear end (an upwardly facing surface) 32b of the tube insertion hole 32 in the annular mounting fixture 31. Then, this product in process before brazing is placed in a vacuum oven so that the brazing filler material 220 is heated to melt the same (reflow). By so doing, the melted brazing filler is caused to flow into a gap defined between the inner circumferential surface of the tube insertion hole 32 in the annular mounting fixture 31 and the outer circumferential surface of the tube 11 for brazing. Also, the brazing filler material 220 may be applied to the location described above in the form of a paste.

[Patent Literature 1] JP-A-S62-278421

PROBLEMS TO BE SOLVED BY THE INVENTION

A problem is encountered in the above brazing method. Namely, the front end 12 of the tube 11 is brought into abutment with the upper surface 201 of the positioning table so that the tube 11 is positioned in the longitudinal direction thereof with respect to the annular mounting fixture 31. Because of this, in the event that foreign matter is deposited on the front end 12 of the tube 11 or the upper surface 201 of the positioning table, the tube 11 is shifted erroneously rearwards a distance equal to the thickness of the deposition with respect to the annular mounting fixture 31. Additionally, when such a deposition is present on the top 12 of the tube 11, the deposition needs to be removed from the front end 12 in a later step. The positioning table is made of a heat resistant material (for example, carbon), and therefore, the table is easily soiled or worn. Thus, the above-described problem tends to occur often.

On the other hand, in the event that a deposition is present on the support portion 215 of the support jig 211 which supports the annular mounting fixture 31, the annular mounting fixture 31 is shifted erroneously upwards a distance equal to the thickness of the deposition from the upper surface 201 of the positioning table. Therefore, the tube 11 is shifted erroneously forwards (downwards) with respect to the annular mounting fixture 31 (or projects too much from the annular mounting fixture 31). Namely, opposite to what has been described above, since the tube 11 is shifted erroneously in the direction of the front end with respect to the annular mounting fixture 31, the dimensional accuracy of the dimension L1 is reduced.

In positioning such a sensor tube with respect to the annular mounting fixture, adopting a tube 11, as shown in FIG. 20, having different diameters or a diametrically different shape such that a portion of the tube 11 which lies further rearwards than a rear end 32b of a tube insertion hole 32 in the annular mounting fixture 31 is thicker in diameter than an inside diameter of the tube insertion hole 32, has been considered. Then, a small-diameter tubular portion 15 of the tube 11 which is relatively smaller in diameter than the rearward portion is inserted through the tube insertion hole 32, and a tip or front end 16 of the rearward portion lying further rearwards than the small-diameter tubular portion 15, that is, the large-diameter tubular portion 17, is locked on the rear end (a circumferential edge or a rear end-facing surface) 32b of the tube insertion hole 32 so that the tube 11 is positioned with respect to the annular mounting fixture 31. Namely, the annular mounting fixture 31 is supported by a support jig 211 which is similar to that described above, while the tube 11 is positioned in the longitudinal direction with respect to the annular mounting fixture 31 without bringing the front end 12 of the tube 11 into abutment with the upper surface 201 of the positioning table. Thus, when positioned in this manner, the problem of the tube 11 being shifted erroneously in the longitudinal direction due to the depositions can be solved.

However, when the tube 11 having a diametrically different shape is positioned in the longitudinal direction thereof by inserting the small-diameter tubular portion 15 into the tube insertion hole 32 in the annular mounting fixture 31 and bringing the front end 16 of the large-diameter tubular portion 17 of the tube 11 into locking engagement with the rear end 32b of the tube insertion hole 32, the front end (a front end portion or a front end-facing surface) 16 of the large-diameter tubular portion 17 closes a gap defined between an inner circumferential surface of the insertion hole 32, that is, the tube insertion hole and an outer circumferential surface of the small-diameter tubular portion. Because of this, when a brazing filler material 220 is disposed and heated to melt the same as described above in such a locked state, the flow of the melted brazing filler into the gap defined between the inner and outer circumferential surfaces is interrupted. Because of this, the brazing filler does not wet the gap widely (over a large area) in a smooth fashion, resulting in a problem that a brazing (welding) failure (a sealing failure) may arise.

SUMMARY OF THE INVENTION

The invention has been made in view of above-described problems, and an object thereof is to provide a sensor in which a tube is inserted in a tube insertion hole in an annular mounting fixture in a loose fit fashion and an inner circumferential surface of the tube insertion hole and an outer circumferential surface of the tube are joined together by means of brazing so as to maintain a seal in a front-to-rear direction of the tube without resulting in a flowing failure of a melted brazing filler and which can hold a high positioning accuracy of the tube in the front-to-rear direction with respect to the annular mounting fixture.

The above object has been achieved by providing (1) a sensor comprising an annular mounting fixture and a tube which is inserted into a tube insertion hole of the annular mounting fixture in a loose fit fashion, a gap between an inner circumferential surface of the tube insertion hole and an outer circumferential surface of the tube is brazed so as to maintain a seal in a front-to-rear direction of the sensor, and a sensor element is provided at a front end portion in an interior of the tube, wherein the tube comprises a small-diameter tubular portion which is inserted into the tube insertion hole in a loose fit fashion and a large-diameter tubular portion which is disposed at the rear of the small-diameter tubular portion and which has a diameter larger than an inside diameter of the tube insertion hole, wherein a flow path (or an opening) is formed between a rear end of the tube insertion hole and a front end of the large-diameter tubular portion, so that when the tube is inserted into the tube insertion hole and the front end of the large-diameter tubular portion of the tube is locked on the rear end of the tube insertion hole, a rear end of the gap, which is defined between an inner circumferential surface of the tube insertion hole and an outer circumferential surface of the small-diameter tubular portion of the tube, is not closed by the rear end of the tube insertion hole and the front end of the large-diameter tubular portion, and so that a melted brazing filler can flow into the gap from a circumferential edge of the rear end of the tube insertion hole, and wherein the inner circumferential surface of the tube insertion hole and the outer circumferential surface of the small-diameter tubular portion of the tube are brazed together with the brazing filler which flows into the gap after having flowed through the flow path (or the opening) from the circumferential edge of the rear end of the tube insertion hole.

In a preferred embodiment (2), the present invention provides a sensor as set forth in (1) above, wherein the flow path (or the opening) comprises an uneven portion provided on at least one of the rear end of the tube insertion hole and the front end of the large-diameter tubular portion.

In another preferred embodiment (3), the present invention provides a sensor as set forth in (1) or (2) above, wherein the flow path (or the opening) comprises a plurality of uneven portions provided along a circumferential direction on at least one of the rear end of the tube insertion hole and the front end of the large-diameter tubular portion.

In yet another preferred embodiment (4), the present invention provides a sensor as set forth in any one of (1) to (3) above, wherein the sensor is a temperature sensor.

In yet another preferred embodiment (5), the present invention provides a sensor as set forth in any one of (1) to (4) above, wherein the annular mounting fixture has a thread which fits into an internal thread formed on a threaded hole in a mounting target location for the sensor, has the shape of a hollow bolt having a hollow portion which penetrates therethrough to constitute the tube insertion hole, and has a screwing tool engagement portion at the rear of the thread.

In yet another preferred embodiment (6), the present invention provides a sensor as set forth in any one of (1) to (4) above, wherein the annular mounting fixture is an annular member not having a thread which fits into an internal thread formed on a threaded hole in a mounting target location for the sensor and has therein a hollow portion which penetrates therethrough to constitute the tube insertion hole.

In yet another preferred embodiment (7), the present invention provides a sensor as set forth in (6) above, wherein the annular member is pressed by a hollow bolt member having a thread which fits into the internal thread formed on the threaded hole in the mounting target location for the sensor by fitting the hollow bolt member on the tube from the rear thereof and screwing the hollow bolt member into the threaded hole so that the thread on the hollow bolt member fits into the internal thread on the threaded hole, and functions as a flange which is pressed against a sitting surface lying deep in the threaded hole by the pressing action to thereby maintain a seal.

In yet another preferred embodiment (8), the present invention provides a sensor as set forth in (6) or (7) above, wherein the annular member has on a front end face thereof a seal holding surface which is tapered so as to be pressed against the sitting surface lying deep in the threaded hole to thereby maintain a seal.

Advantage Of The Invention

Since the invention is configured as described above, positioning the tube in the front-to-rear direction in the tube insertion hole in the annular mounting fixture depends on locking the large-diameter tubular portion of the tube on the rear end of the tube insertion hole at the front end (the front end facing surface) thereof. Because of this, in this invention, the tube does not have to be supported at the front end thereof (or does not have to be brought into abutment with the upper surface of the positioning table at the front end thereof) when the tube is positioned in the front-to-rear direction to be brazed to the annular mounting fixture. Consequently, although the case with the related art technique, in this invention the relative position error of the tube does not occur which would otherwise be attributed to a deposition on the front end of the tube or the support portion of the support jig where the annular mounting fixture is supported, and a deposition removal step becomes unnecessary. Moreover, when the tube is so locked, the flow path or the opening (hereinafter, also referred to as the flow path) is formed between the rear end of the tube insertion hole and the front end of the large-diameter tubular portion. Consequently, the melted brazing filler flows through the flow path as the introducing flow path from the circumferential edge of the rear end of the tube insertion hole and then enters the gap to wet widely both the inner circumferential surface of the tube insertion hole and the outer circumferential surface of the small-diameter tubular portion of the tube. As a result, the inner and outer circumferential surfaces of the tube insertion hole and the small-diameter tubular portion are brazed together. According to the invention configured this way, the relative position error of the tube does not occur which would otherwise be attributed to the deposition described above, and the deposition removal step becomes unnecessary. In addition, the rear end of the gap defined between the inner circumferential surface of the tube insertion hole and the outer circumferential surface of the small-diameter tubular portion is not completely closed by the rear end of the tube insertion hole and the front end of the large-diameter tubular portion due to the presence of the flow path. Because of this, the flow of the melted brazing filler into the gap from the circumferential edge of the rear end of the tube insertion hole is not interrupted. Therefore, the melted brazing filler easily spreads between the inner and outer circumferential surfaces to wet them widely, thereby making it possible to execute the brazing therebetween without any defect (brazing failure). As a result, a sensor can be provided which can hold a high positioning accuracy of the tube in the front-to-rear direction with respect to the annular mounting fixture and which can provide superior gastightness between the annular mounting fixture and the tube by means of brazing.

In this embodiment, as set forth in (2) above, the flow path can easily be formed by providing an uneven portion on at least one of the rear end of the tube insertion hole and the front end of the large-diameter tubular portion. Although the flow path having an uneven portion may be provided only at one location in the circumferential direction (along the inner circumference of the tube insertion hole), as set forth in (3) above, the flow path is preferably formed by providing a plurality of uneven portions along the circumferential direction. Namely, two or more flow paths may be provided at angular intervals (preferably, at equal angular intervals) in the circumferential direction. By so doing, the melted brazing filler which is coated or disposed and heated to be melted in the corner formed by the circumferential edge of the rear end of the tube insertion hole in the annular mounting fixture and the outer circumferential surface near the front end of the large-diameter tubular portion of the tube is allowed to quickly spread between the inner circumferential surface of the tube insertion hole and the outer circumferential surface of the small-diameter tubular portion to wet the same widely via the plural flow paths thus formed. By so doing, the occurrence of brazing failure (gastightness failure) can be prevented more effectively. In this manner, in this invention, a brazing which provides a high sealing performance is obtained between the inner circumferential surface of the tube insertion hole in the annular mounting fixture and the outer circumferential surface of the tube. Therefore, the sensor of the invention is suitable for a temperature sensor which is mounted at a mounting target location in an exhaust system of a motor vehicle.

As set forth in (5) above, the annular mounting fixture of the invention is a hollow bolt-like mounting fixture having a thread which fits in the internal thread on the threaded hole in the mounting target location for the sensor and has a hollow portion which penetrates therethrough in the front-to-rear direction to constitute the tube insertion hole. A hollow bolt-like mounting fixture having a screwing tool engagement portion at the rear of the thread is also provided. In addition to these types of annular mounting fixtures, as set forth in (6) above, the annular mounting fixture may be an annular member which has no thread which fits into the internal thread on the threaded hole in the mounting target location for the sensor and which has therein a hollow portion which penetrates therethrough in the front-to-rear direction to constitute the tube insertion hole. Namely, according the concept of this invention, the annular mounting fixture includes a wide variety of annular fixtures for use in mounting a sensor.

In addition, as set forth in (7) above, the annular member is pressed by the hollow bolt-like member having a thread which fits into the internal thread formed on the threaded hole in the mounting target location for the sensor by fitting the hollow bolt-like member on the tube from the rear thereof and screwing the hollow bolt-like member into the threaded hole so that the thread on the hollow bolt-like member fits into the internal thread on the threaded hole. Moreover, the annular member can also function as a flange which is pressed against a sitting surface lying deep in the threaded hole by the pressing action to thereby maintain a seal. Additionally, the annular member preferably takes the form as set forth in (8) above. Namely, the annular member has on the front end face thereof a seal holding surface which is tapered forwards so as to be pressed against the sitting surface lying deep in the threaded hole to thereby maintain a seal. The angle (gradient) at which the seal holding surface is tapered may be set in relation to the shape or construction of the sitting surface lying deep in the threaded hole.

In the sensor which utilizes the hollow bolt-like annular mounting fixture as set forth in (5) above, in mounting the sensor in the threaded hole in the mounting target location, the sensor is integrated with the annular mounting fixture by being brazed thereto around the axis of the thread, and the sensor is then rotated together with the annular mounting fixture to be mounted on the mounting target location. In contrast to this, in the sensor which utilizes an annular member having a thread which fits into the internal thread on the threaded hole in the mounting target location as set forth in (6) above, for example, as set forth in (7) above, the hollow bolt-like member, which is a separate part, is fitted on the tube from the rear thereof, and the hollow bolt-like member is screwed into the threaded hole in the mounting target location for the sensor. In this manner the annular member is pressed by the hollow bolt-like member, thereby making it possible to mount the sensor without rotating the sensor itself. In this way, when the sensor itself is not rotated, the lead wires pulled out from the sensor do not have to be rotated together with the sensor when the sensor is mounted, whereby the screwing work becomes accordingly simple.

BRIEF DESCRIPTION OF THE DRAWINGS

FIG. 13 shows explanatory views of the annular mounting fixture as the part constituting the sensor shown in FIG. 11, in which

FIG. 17 shows explanatory views of a modified example of an annular mounting fixture as a part constituting the sensor shown in FIG. 11, in which

DESCRIPTION OF REFERENCE NUMERALS

Figure 1:
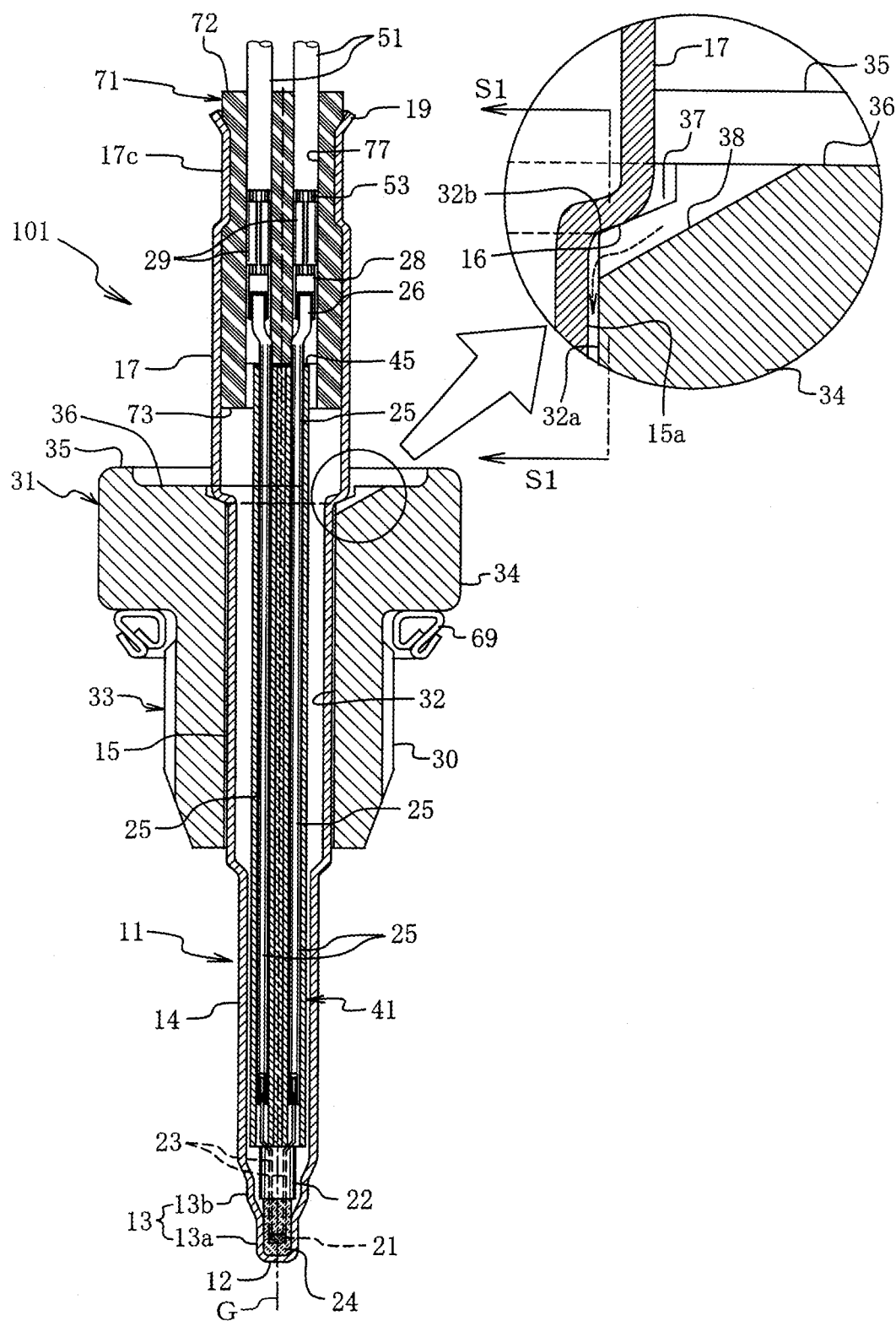
FIG. 1 shows a vertical sectional view of a first embodiment which embodies a sensor of the invention and an enlarged view of an essential part thereof.
Figure 2:
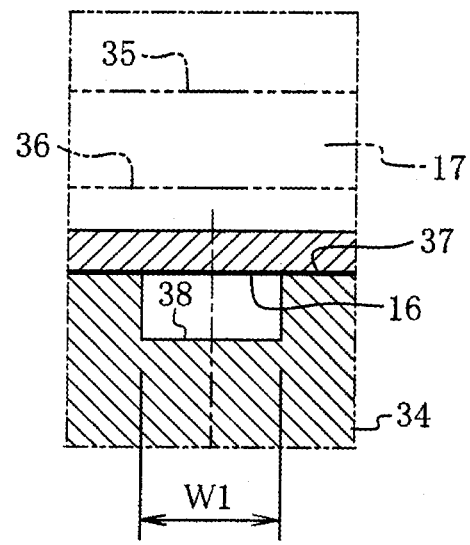
FIG. 2 is a sectional view taken along the line S1-S1 in the essential part enlarged view in FIG. 1.
Figure 3:
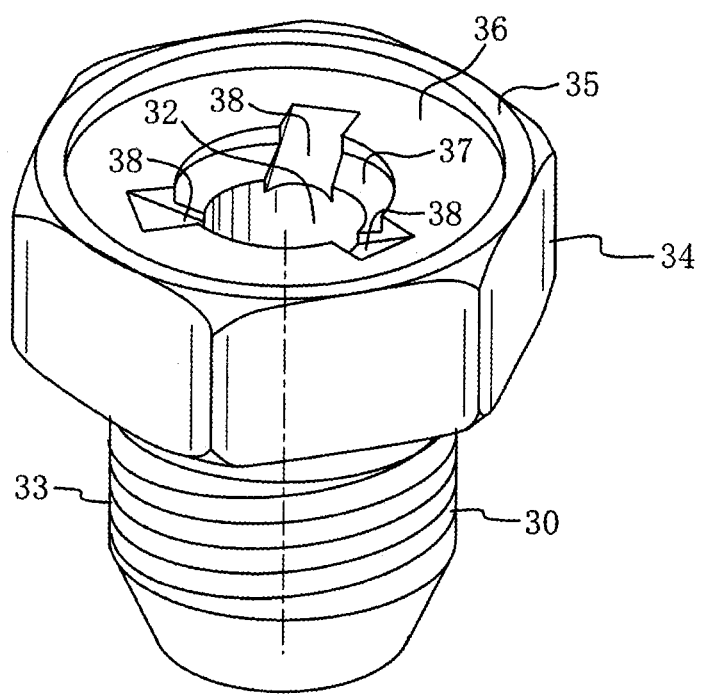
FIG. 3 is a perspective view of an annular mounting fixture constituting the sensor shown in FIG. 1 as seen from a rear end side thereof.
Figure 4:
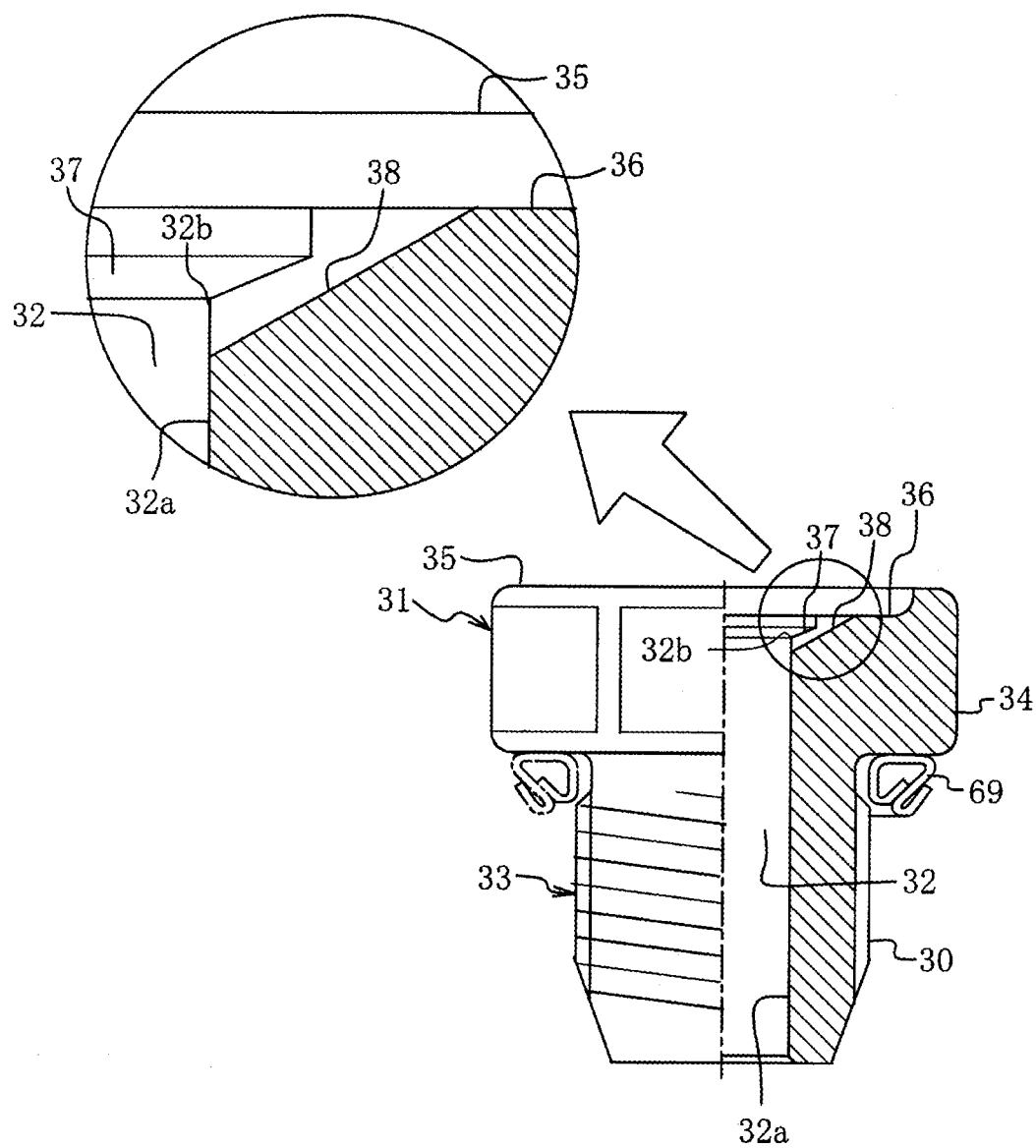
FIG. 4 shows a half-sectional view of the annular mounting fixture constituting the sensor shown in FIG. 1 and an enlarged view of an essential part thereof.
Figure 5:
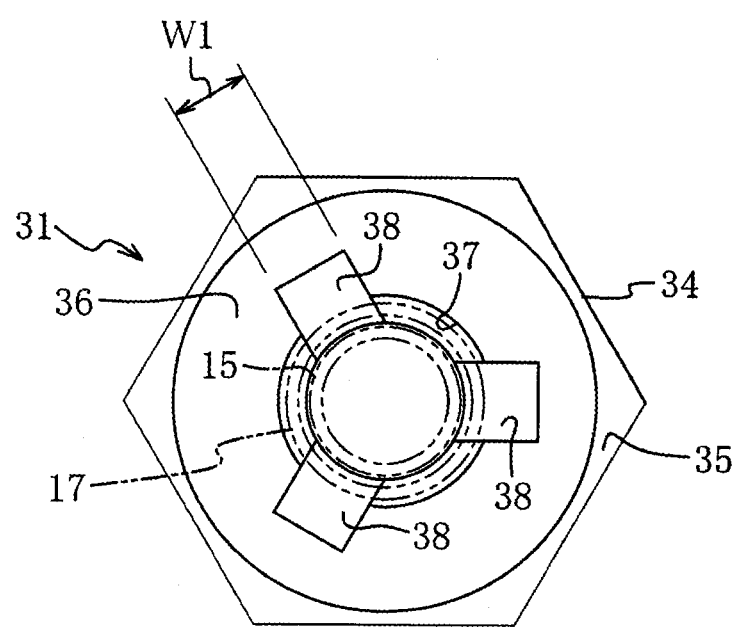
FIG. 5 is a plan view of the annular mounting fixture constituting the sensor shown in FIG. 1 as seen from the rear end side thereof.
Figure 6:
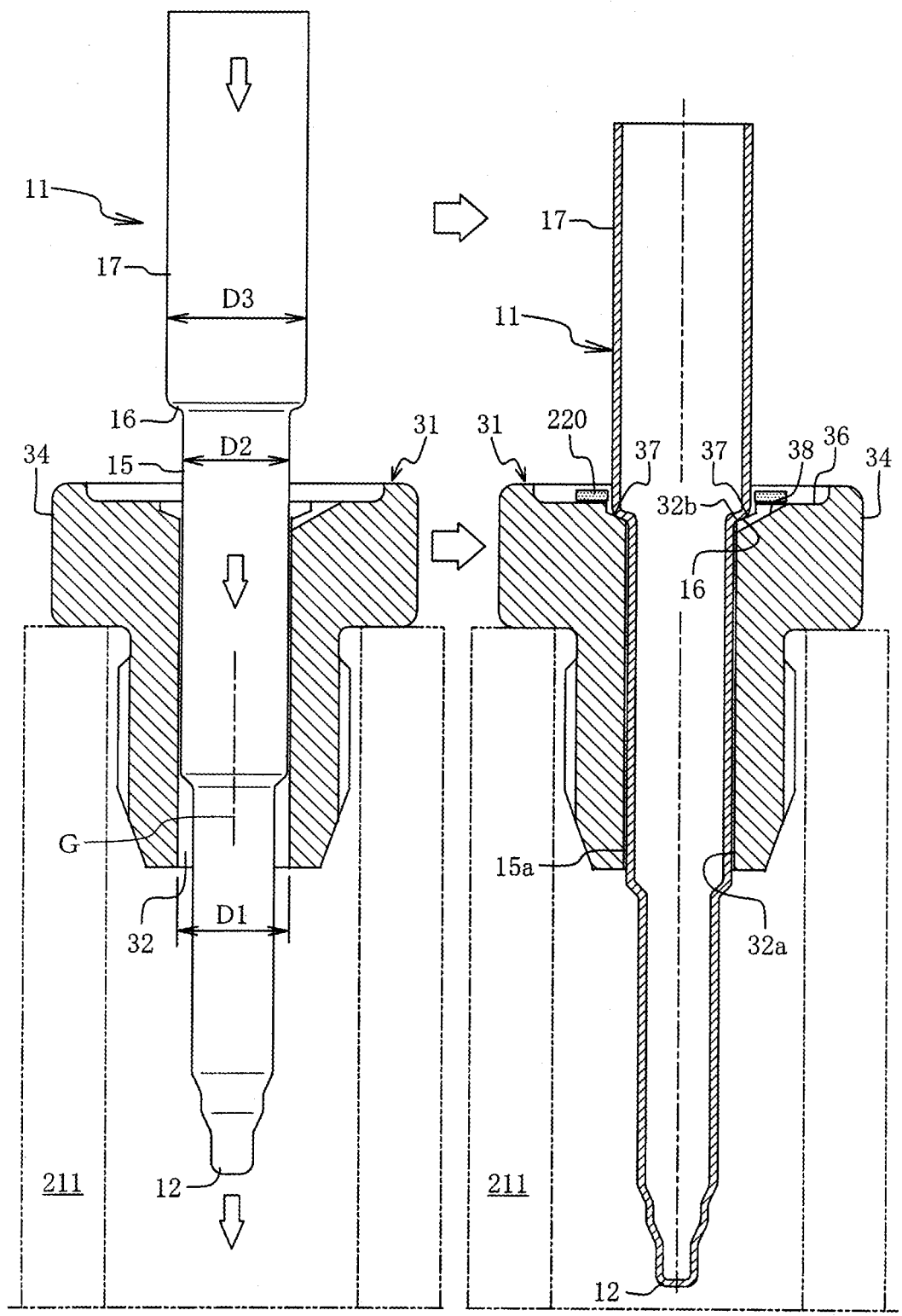
FIG. 6 shows sectional views illustrating a step in a production process of the sensor shown in FIG. 1 where a tube is inserted into a tube insertion hole in the annular mounting fixture and is positioned in place therein for brazing, of which a left sectional view is an explanatory sectional view illustrating a state in which the tube is inserted into the tube insertion hole in the annular mounting fixture which is supported on a support jig and a right sectional view shows a state resulting after the tube has been so inserted.

Reference numerals used to identify various structural features in the drawings include the following.
11 Tube; 15a Outer circumferential surface of small-diameter tubular portion; 15 Small-diameter tubular portion of tube; 16 Front end (front end facing surface) of large-diameter tubular portion; 17, 17k, 17m Large-diameter tubular portion of tube; 21 Sensor element; 31, 131, 231, 331 Annular mounting fixture; 32 Tube insertion hole; 32b Rear end of tube insertion hole; 32a Inner circumferential surface of tube insertion hole; 18, 38 Flow path (opening); 101, 301 Sensor.

DETAILED DESCRIPTION OF THE PREFERRED EMBODIMENTS

The invention will next be described in detail with reference to the drawings. However, the present invention should not be construed as being limited thereto.

An embodiment (a first embodiment) of a sensor of the invention will be described in detail by reference to FIGS. 1 to 7. In FIG. 1, reference numeral 101 denotes a sensor which includes a tube 11 made of metal (for example, an SUS stainless steel metal) which is closed at a tip or front end (a lower end in FIG. 1) thereof and a sensor element 21 which is disposed in an interior of the tube 11 at a location lying at or closer to the front end 12 of the tube 11. The tube 11 having the sensor element 21 disposed therein is inserted into a tube insertion hole 32 which is a circular hole in a center (an inside) of an annular mounting fixture 31 which is made of an SUS metal, for example. Then, the tube 11 is brazed to the annular mounting fixture 31 with, for example, a copper brazing filler (not shown) at a location between an outer circumferential surface of the tube 11 and an inner circumferential surface 32a of the tube insertion hole 32. Although described in detail below, the annular mounting fixture 31 is made up of an annular portion (a cylindrical portion) 33 having a thread 30 on an outer circumferential surface thereof and a screwing tool engagement portion 34 which is formed larger in diameter than the annular portion 33 at a rear end or an upper end as shown in FIG. 1 of the annular portion 33 and an outer circumferential surface formed into a polygonal shape (for example, a hexagonal portion). Thus, the annular mounting fixture 31 has a hollow bolt-like configuration.

The tube 11 will be described. In this embodiment, as shown in FIG. 1 and the like, the tube 11 has a concentric tubular configuration having different diameters whose diameter is gradually increased from the closed front end 12 towards a rear end (an upper end shown in FIG. 1) 19 thereof. Specifically, a portion of the tube 11 which lies closer to the front end 12 is formed into an element accommodating portion 13 which is configured as a tubular portion having a smallest outside diameter, and a portion which follows this element accommodating portion 13 rearwards (upwards in FIG. 1) is formed into a near-front-end straight tubular portion 14 which is larger in diameter than the element accommodating portion 13. Additionally, an intermediately positioned straight tubular portion 15, which follows the near-front-end straight tubular portion 14 rearwards and which is larger in diameter than the near-front-end straight tubular portion 14, is provided in an intermediate position in a front-to-rear direction of the tube 11. In this embodiment, this intermediately positioned straight tubular portion 15 is configured as a small-diameter tubular portion which is inserted into the tube insertion hole 32 in the annular mounting fixture 31 with a minute gap defined therebetween that is to be brazed. Hereinafter, this intermediately positioned straight tubular portion 15 is referred to as a small-diameter tubular portion 15. Although the annular mounting fixture 31 will be described in detail below, a cylindrical large-diameter tubular portion 17 which is larger in diameter than the tube insertion hole 32 and the small-diameter tubular portion 15, is provided at the rear of the small-diameter tubular portion 15 (a location lying near a rear end of the tube 11) concentrically with the small-diameter tubular portion 15. In this way, in this embodiment, the tube 11 is formed into a cylindrical tube having different diameters which is made up of the element accommodating portion 13, the near-front-end straight tubular portion 14, the small-diameter tubular portion 15 and the large-diameter tubular portion 17 sequentially in that order so that the diameter gradually increases in a concentric fashion from the front end to the rear end thereof. In this embodiment, as shown in FIG. 1, the element accommodating portion 13 is formed of a first small-diameter portion 13a and a second small-diameter portion 13b which is concentric with and is larger in diameter than the first small-diameter portion 13a. Therefore, on the whole, the tube 11 is formed into the cylindrical tube whose diameter is increased concentrically and sequentially in five stages. A front end of the large-diameter tubular portion 17 which constitutes a boundary portion between the small-diameter tubular portion 15 and the large-diameter tubular portion 17 which lies at the rear of the small-diameter tubular portion 15 is formed into an annular front-end facing surface (an annular surface) 16 which is tapered acutely towards the front end (which contracts towards the front end at an angle of 45 to 60 degrees with respect to an axis G).

In the tube 11 configured as described above, a sensor element (a heat sensing element) 21 which is made up of a thermistor sintered member and which is sealed with a glass (glass seal portion) 24 is disposed within the element accommodating portion 13 disposed at the front end 12. An insulator tube (an insulation tube) 41 is disposed at the rear of the sensor element 21 so as to extend in the front-to-rear direction via an element support member (a ceramic member) 22 which supports the sensor element 21. The insulator tube 41 is made of ceramic and is a cylindrical tube having a constant cross section which has in an interior thereof two holes which are formed to penetrate along the axis G. Two electrode wires 23 which extend rearwards from the element 21 and conductors made up of core wires 25 which are connected to the electrode wires 23 are passed through the insulator tube 41 via the element support member 22. This insulator tube 41 is held in the straight tubular portion 14 which is disposed near the front end of the tube 11 so as to be surrounded by an inner circumferential surface of the straight tubular portion 14 via a minute space.

Rear ends 26 of the core wires 25 are arranged to project from a rear end 45 of the insulator tube 41, and terminal fixtures 28 are fixed to the rear ends 26 through welding. Additionally, front ends 53 of resin coated lead wires (electric signal pick-up electric wires) 51 are connected to crimp terminal portions 29 of the terminal fixtures 28 through crimping. The lead wires 51 are pulled out from the rear end 19 of the tube 11 (a rear end 72 of a seal member 71) to the outside (the rear, upwards in FIG. 1) of the tube 11. However, portions of the core wires 25 and the lead wires 51 which extend from the rear end 45 of the insulator tube 41 to portions lying near the front ends 53 of the lead wires 51 are passed in the front-to-rear direction via through holes 77 in the cylindrical seal member 71. The cylindrical seal member made of rubber (heat resistant rubber) is disposed in the large-diameter tubular portion 17 which constitutes the portion of the tube 11 which lies near the rear end thereof. In this embodiment, a center of a front end 73 of the seal member 71 is depressed into a depressed portion, and the rear end 45 of the insulator tube 41 is caused to enter the depressed portion so as to be brought into abutment with a bottom of the depressed portion. Then, by loading the seal member 71 configured as described above in a predetermined position within the large-diameter tubular portion 17 which is disposed at a rear end portion of the tube 11 and crimping to compress the rear end portion of the tube 11 or a rear end portion 17c of the large-diameter tubular portion 17 so as to diametrically contract the same, a seal within the rear end portion 17c is held while pressing the insulator tube 41, the element support member 22, and the sensor element 21 sealed with the glass 24 against an inner surface of the front end 12 of the tube 11. In FIG. 1, reference numeral 69 denotes a seal washer which is used to hold a seal when the sensor 101 is screwed into a threaded hole in a mounting target location on an exhaust manifold.

Next, the annular mounting fixture 31 will be described in detail. Although briefly described above, in this embodiment, as shown in FIGS. 1 to 5, this annular mounting fixture 31 constitutes a mounting portion where the sensor 101 is mounted on an exhaust manifold (not shown). The exhaust manifold constitutes a mounting target location of the sensor 101 by the sensor 101 being screwed into a mounting hole (a threaded hole) in the exhaust manifold. The mounting fixture 31 includes the thread 30 on the outer circumferential surface of the annular portion (the cylindrical portion) 33. Additionally, the mounting fixture 31 includes the polygonal screwing tool engagement portion (for example, the polygonal portion (refer to FIGS. 3 and 4)) 34 which is provided at a rear end portion of the annular portion (the cylindrical portion) 33. This screwing tool engagement portion 34 is provided concentrically with the annular portion 33 and is larger in diameter than the diameter of the thread 30. On the other hand, the tube insertion hole 32 in the center of the annular mounting fixture 31 is formed into a cylindrical open hole (a hollow portion) which extends in the front-to-rear direction with a constant diameter (refer to a left-hand diagram in FIG. 6). An inside diameter D1 of the tube insertion hole 32 is minutely larger than an outside diameter D2 of the small-diameter tubular portion 15 and is smaller than an outside diameter D3 of the large-diameter tubular portion 17 so that the small-diameter tubular portion 15 of the tube 11 is inserted into the tube insertion hole 32 in a loose fit fashion to be brazed.

On the other hand, a rear end (an annular end face) 35 of the tool engagement portion 34 which constitutes a rear end of the annular mounting fixture 31 is formed into an annular depressed surface 36 which is depressed relative to an outer circumferential edge thereof. Additionally, in this embodiment, a portion of the depressed surface 36 which lies near the tube insertion hole 32, that is, a rear end 32b of the tube insertion hole 32 is formed into a depressed portion 37 in which a bottom portion is depressed so as to contract towards the front end in a tapered fashion along a circumferential direction of the tube insertion hole 32 (refer to the enlarged view in FIG. 1). This depressed portion 37 constitutes an annular step which receives the front-end facing surface (the annular surface) 16 which constitutes the front end of the large-diameter portion 17 of the tube 11 so as to lock it in a seated fashion. The depressed portion 37 is formed into a trough through which a brazing filler flows or a brazing filler reservoir in a brazing or brazing step. Additionally, the degree at which the bottom portion of the depressed portion 37 is tapered is made substantially the same as the degree at which the front-end facing surface (the front end) 16 of the large-diameter portion 17 is tapered.

In addition, in this embodiment, a melted brazing filler flowing flow path (opening) 38 is formed in a predetermined width W1 and depth at a location lying near the axis G on the depressed surface 36 of the rear end (the annular end face) 35 of the tool engagement portion 34. The flow path 38 is positioned at the rear portion of the annular mounting fixture 31 so as to be continuous obliquely with the inner circumferential surface 32a of the tube insertion hole 32 at a location lying near the rear end 32b of the tube insertion hole 32. Namely, the flow path 38 is cut deep from an outer side of an outer circumferential edge of the depressed portion 37 towards a portion lying further forwards than the bottom portion of the depressed portion 37 which constitutes an inner circumferential edge thereof so as to be formed into a depressed groove which forms a flowing gradient of the melted brazing filler. Although one flow path 38 may be provided, in this embodiment, plural (three at equal angular intervals) flow paths 38 are formed along a circumferential direction (refer to FIGS. 3, 5) at the rear end 32b of the tube insertion hole 32.

In this configuration, when the tube 11 is inserted into the tube insertion hole 32 in the annular mounting fixture 31 from the rear with the front end 12 oriented downwards, the small-diameter tubular portion 15 of the tube 11 is inserted into the tube insertion hole in a loose fit fashion. At the same time, the front end facing surface 16 which forms the front end of the large-diameter tubular portion 17 and which lies at the rear of the small-diameter tubular portion 15 enters the depressed portion 37 at the rear end 32b of the tube insertion hole 32 and is then brought into abutment with the bottom portion of the depressed portion 37 so as to be locked in place. As this occurs, in this embodiment, since the melted brazing filler flow paths 38 are formed, even in such a locked state, a rear end of a gap defined between the inner circumferential surface 32a of the tube insertion hole 32 and an outer circumferential surface 15a of the small-diameter tubular portion 15 of the tube 11 is not closed (refer to an enlarged view of FIG. 1 and FIG. 2). Namely, a brazing filler melted at a location lying closer to the large-diameter tubular portion 17 on the depressed surface 36 at the rear end (the annular end face) 35 of the tool engagement portion 34 passes through the flow path 38. This is indicated by an arrow of a broken line in the enlarged view of FIG. 1 so that the melted brazing filler flows from a circumferential edge of the rear end 32b of the tube insertion hole 32 into the gap defined between the inner circumferential surface 32a of the tube insertion hole 32 and the outer circumferential surface 15a of the small-diameter tubular portion 15. Then, the inner circumferential surface 32a of the tube insertion hole 32 and the outer circumferential surface 15a of the small-diameter tubular portion 15 are brazed together with the melted brazing filler which enters the gap to wet widely both the circumferential surfaces.

Thus, as described below, the sensor 101 of the embodiment is produced by the steps of inserting the tube 11 into the tube insertion hole 32 in the annular mounting fixture 31 in a loose fit fashion and brazing the gap defined by the tube insertion hole 32 and the tube 11. Namely, as shown in the left-hand side view of FIG. 6, the annular mounting fixture 31 is supported on a support jig 211 via a front end facing surface of the tool engagement portion 34 of the annular mounting fixture 31 by virtue of its own weight. Following this, the tube 11, which is a constituent part, is inserted into the tube insertion hole 32 in the annular mounting fixture 31 from the rear so that the small-diameter tubular portion 15 of the tube 11 is loosely held therein. Thus, the tube 11 is supported by the front end facing surface 16 which is formed into the annular (tapered) portion at the front end of the large-diameter tubular portion 17 that is locked on a bottom surface of the depressed portion 37 at the rear end 32b of the tube insertion hole 32. As this occurs, the front end 12 of the tube 11 is left as a free end. In this locked state, the tube 11 is positioned in the front-to-rear (or longitudinal) direction with respect to the annular mounting fixture 31. Thus, the annular mounting fixture 31 is preferably disposed so that the tube 11 is vertical.

In the sensor 101 fabricated to this extent, a brazing filler material piece 220 is disposed in an appropriate position on the depressed surface 36 on the rear end face (the annular end face) 35 of the annular mounting fixture 31, that is, on or near the flow paths 38 near the large-diameter tubular portion 17. Note that a paste forming a brazing filler material may be coated on or near the flow paths 38 before (or after) the tube 11 is inserted into the tube insertion hole 32. Thus, a product in process like this is placed in a reflow oven (a vacuum oven) to heat and melt the brazing filler material. By so doing, the brazing filler material 220 is melted, and the melted brazing filler flows through the flow paths 38 to flow in between the inner circumferential surface 32a of the tube insertion hole 32 and the outer circumferential surface 15a of the small-diameter tubular portion 15 by means of capillary action to thereby wet widely both the circumferential surfaces. By following these steps, the inner and outer circumferential surfaces are brazed together, so that both members are fixed together while ensuring the sealing capability between both members in the front-to-rear direction (in the direction of the axis G) thereof.

Figure 7:
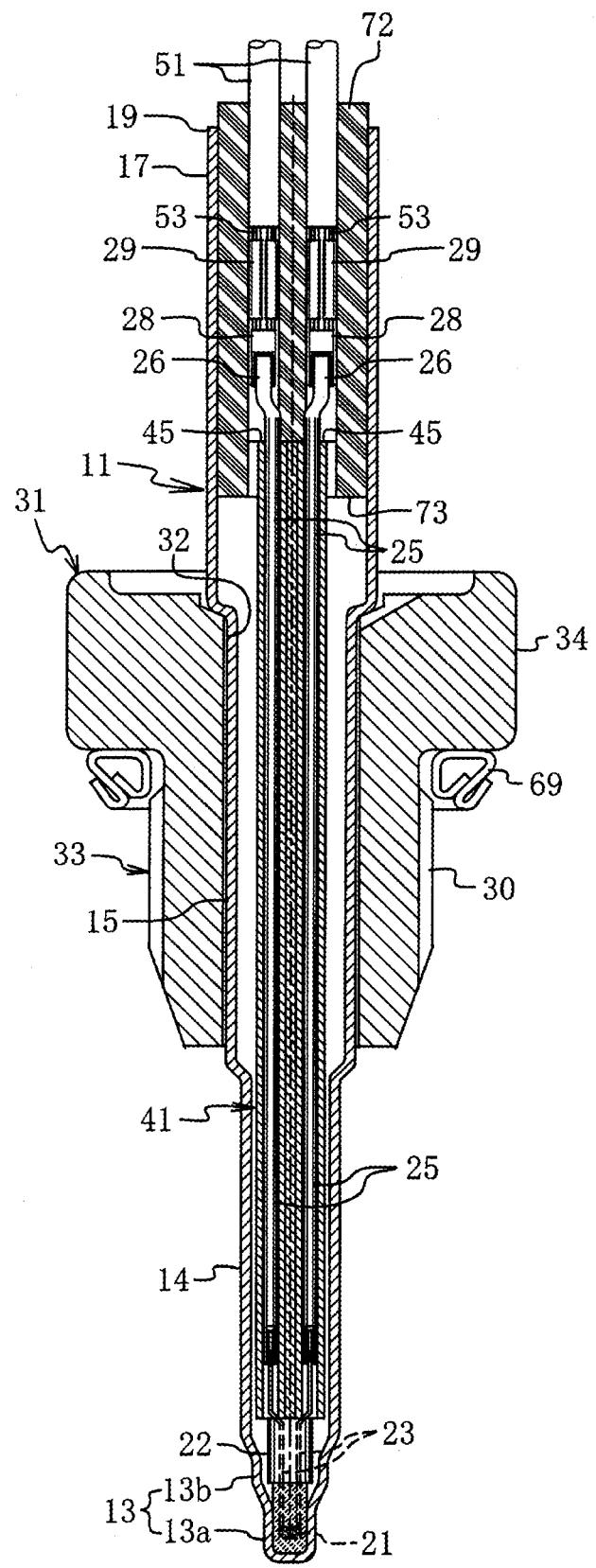
FIG. 7 is an explanatory sectional view showing a state in which a rear end portion of the tube which is the product in process is ready for crimping after the tube has been brazed and an element or the like has been inserted thereinto as shown in FIG. 6.

As described above, after completing the brazing step, the sensor element 21 and the seal member 71 are disposed in the tube 11, so as to obtain the assembly shown in FIG. 7. Then, in the assembly shown in FIG. 7, by crimping a portion of the tube 11 which corresponds to the rubber seal 71 which is disposed in the rear end portion of the tube 11, the sensor 101 of this embodiment shown in FIG. 1 is obtained. In this embodiment, a front end of the small-diameter tubular portion 15 is caused to project slightly further forwards than a front end of the annular mounting fixture 31, and therefore, the tube insertion hole 32 is brazed to the small-diameter tubular portion 15 over a whole area in the front-to-rear direction thereof.

The sensor 101 of this embodiment is configured as described above and is produced by way of a brazing method. Because of this, in positioning the tube 11 in the front-to-rear direction with respect to the annular mounting fixture 31 at the time of brazing, although required of a conventional sensor, the front end 12 of the tube 11 does not have to be supported (that is, the front end does not have to be brought into abutment with the upper surface of the positioning table). Consequently, although it is the case with the conventional sensor, the sensor 101 of this embodiment is free from the position error of the tube 11 in the front-to-rear direction due to deposition on the front end 12 of the tube 11, and the removal step of removing such a deposition becomes unnecessary. Moreover, even in such a state that the front end (the front end facing surface 16) of the large-diameter tubular portion 17 of the tube 11 is locked, the front end of the large-diameter tubular portion 17 is in abutment with the rear end 32b of the tube insertion hole 32. In this manner, there is no such situation that the gap defined between the inner circumferential surface 32a of the tube insertion hole 32 and the outer circumferential surface 15a of the small-diameter tubular portion 15 is completely closed. Namely, when the front end of the large-diameter tubular portion 17 is so locked, as shown in the enlarged view of FIG. 1 and FIG. 2, the flow paths (openings) 38 are formed between the rear end 32b of the tube insertion hole 32 and the front end (the front end facing surface 16) of the large-diameter tubular portion 17. Consequently, in the brazing step, the melted brazing filler flows through the flow paths 38 from the circumferential edge of the rear end 32b of the tube insertion hole 32 and enters the gap between the inner circumferential surface 32a of the tube insertion hole 32 and the outer circumferential surface 15a of the small-diameter tubular portion 15 to thereby wet widely both the inner and outer circumferential surfaces. Because of this, a brazing failure attributed to insufficient wetting of the inner and outer circumferential surfaces does not occur, thereby making it possible to obtain the desired brazing in a smooth fashion.

In this embodiment, the flow path 38 is described as being cut into the depressed groove which extends in a radial direction at the rear end 32b of the tube insertion hole 32 in the annular mounting fixture 31 in order to form the "flow path (opening)" 38. However, the flow path is not limited to the one described above. In this embodiment, any configuration may be adopted, provided that when the tube is inserted into the tube insertion hole and the front end of the large-diameter tubular portion of the tube is locked at the rear end of the tube insertion hole, the rear end of the gap (between the inner circumferential surface of the tube insertion hole and the outer circumferential surface of the small-diameter tubular portion) is not closed by the rear end of the tube insertion hole and the front end of the large-diameter tubular portion, and the flow path or opening is formed between the rear end of the tube insertion hole and the front end of the large-diameter tubular portion so that the melted brazing filler is allowed to flow into the gap from the circumferential edge of the rear end of the tube insertion hole.

Figure 8:
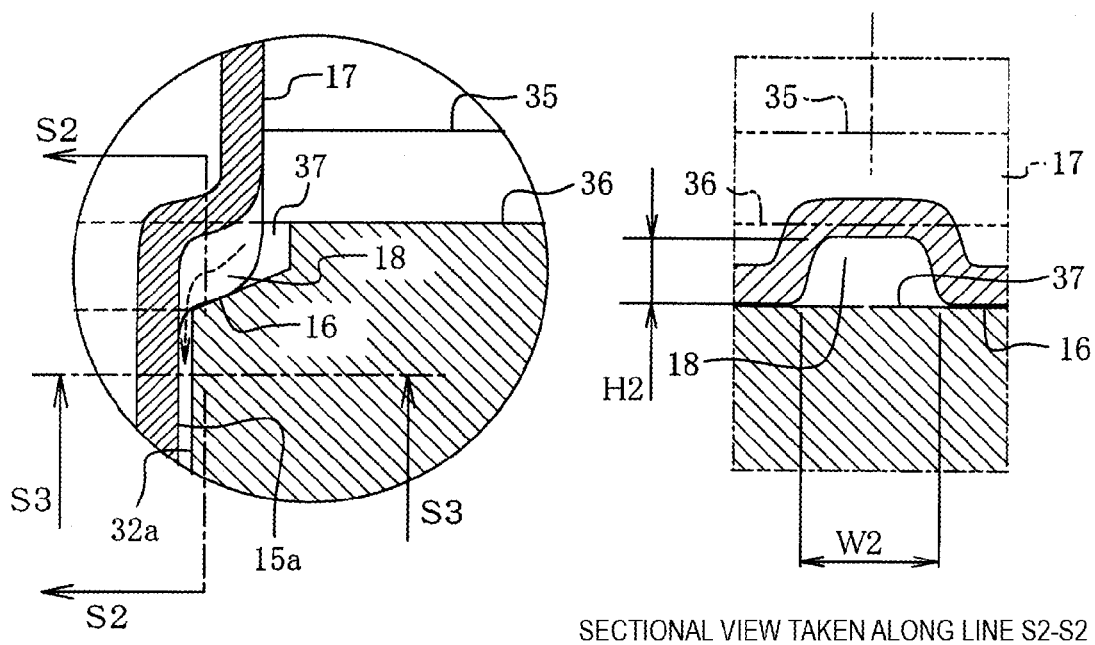
FIG. 8 shows sectional views of a different embodiment, of which FIG. 8(A), a left view, shows an enlarged sectional view depicting an essential part according to the different embodiment (which corresponds to the essential part shown in the enlarged view of FIG. 1) and FIG. 8(B), a right view, is a sectional view taken along the line S2-S2 in the left view.

Consequently, instead of providing the flow paths (openings) 38 at the rear end 32b of the tube insertion hole 32 in the annular mounting fixture 31 in the embodiment described above, as shown in FIGS. 8 and 9, flow paths 18 which are depressed rearwards at a front end (a front end facing surface 16) of a large-diameter tubular portion 17 of a tube 11 may be formed by depressing the large-diameter tubular portion 17 in a predetermined width W2 and depth H2 from an outer side (an outer circumferential surface) of the large-diameter tubular portion 17 towards a center of the tube 11 (in a radial direction). FIG. 8 shows the flow path 18 which is formed at a location corresponding to the location shown in the enlarged view of FIG. 1, and the configurations of the other portions of this embodiment remain the same as those of the previous embodiment. Consequently, like reference numerals are given to like portions to those of the previous embodiment, and the detailed description thereof will be omitted here.

Namely, in this embodiment, too, the depressed groove which extends from the outer circumferential surface side to the center of the tube is formed by depressing the front end of the large-diameter tubular portion 17 which constitutes the tube, that is, the front end facing surface (the annular portion) 16 which constitutes a boundary with a small-diameter tubular portion 15 to the rear (upwards in FIG. 8), and the depressed groove so formed is made to function as the flow path 18. In this case, too, although only one depressed groove may be provided, plural depressed grooves may be provided around the tube at angular intervals (for example, equal angular intervals). In both the embodiments, the depressed grooves are described as being formed as the flow paths. On the contrary, however, plural projecting portions may be provided around the tube at angular intervals (for example, equal angular intervals). Namely, in the event that the plural projecting portions are provided, the remaining portions constitute depressed grooves between the projecting portions, and these depressed grooves are made to function as flow paths.

Additionally, flow paths may be formed by providing unevenness (an uneven portion, for example, projections and protrusions) on both a rear end 32b of a tube insertion hole 32 in an annular mounting fixture 31 and the front end (the front end facing surface) of the large-diameter tubular portion 1 of the tube. Incidentally, the "flow path" in the invention may be such that in the case of no flow path being provided, the gap between the inner circumferential surface 32a of the tube insertion hole 32 and the outer circumferential surface 15a of the small-diameter tubular portion 15 is not closed by the front end (the locked portion) of the large-diameter tubular portion 17 of the tube which is locked at the rear end 32b of the tube insertion hole 32. Moreover, the melted brazing filler which is heated at the circumferential edge of the rear end 32b of the tube insertion hole 32 can flow into the gap defined between the inner and outer circumferential surfaces by means of capillary action. Consequently, the sectional shape and dimensions of the depressed groves which are formed by the unevenness should be set as required so that the flow of the melted brazing filler is ensured in consideration of the number and position of the depressed grooves so formed.

The invention is not limited to the embodiments that have been described heretofore and can be embodied in various ways without departing from the spirit and scope thereof. Specifically, in the embodiments described above, the flow paths 38, 18 are described as being formed by providing the unevenness on at least either the rear end 32b of the tube insertion hole or the front end of the large-diameter tubular portion 17. However, the invention may be embodied without being limited to such configuration. For example, the flow path 18 shown in FIG. 8 is formed by depressing rearwards the front end (the front end facing surface 16) of the large-diameter tubular portion 17 to the depth H2. However, the depth of the flow path 18 may be made so deep that the flow path 18 reaches the rear end of the tube. This is because even in the event that this configuration is adopted, the melted brazing filler can similarly flow into the gap.

Figure 9:
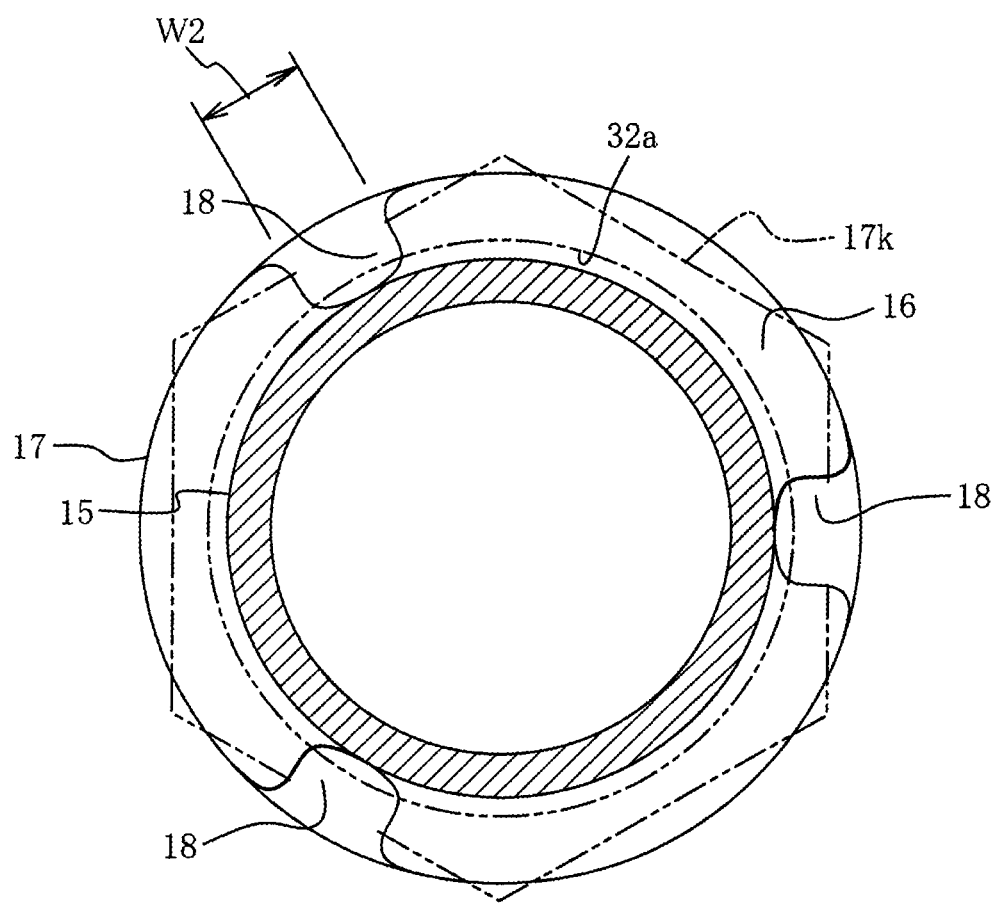
FIG. 9 is a sectional view taken along the line S3-S3 in FIG. 8(A) with an annular mounting fixture omitted.

Further, in the embodiments described above, the flow paths are described as being formed based on the tube having a circular cross section. However, the outer circumferential surface (contour) of the large-diameter tubular portion, in particular, of the tube may be configured differently. Namely, as shown in FIG. 9, a large-diameter tubular portion 17k may be formed as indicated by chain double-dashed lines so as to have a cross section (a section normal to an axis of a tube) which is polygonal such as hexagonal or octagonal. Then, depressed grooves which form flow paths 18 may then be provided on the sides of the polygonal cross section. Thus, in the case of the polygonal large-diameter tubular portion 17k being adopted, too, as shown in a cross-sectional view in FIG. 10, the depressed grooves which form the flow paths 18 may extend continuously from the front end facing surface 16 which constitutes the front end of the large-diameter tubular portion 17k through a rear end thereof, as with the embodiments described above. Namely, the depressed grooves that form the flow paths 18 may extend continuously along an overall length of the large-diameter tubular portion 17k in a front-to-rear direction thereof.

Figure 10:
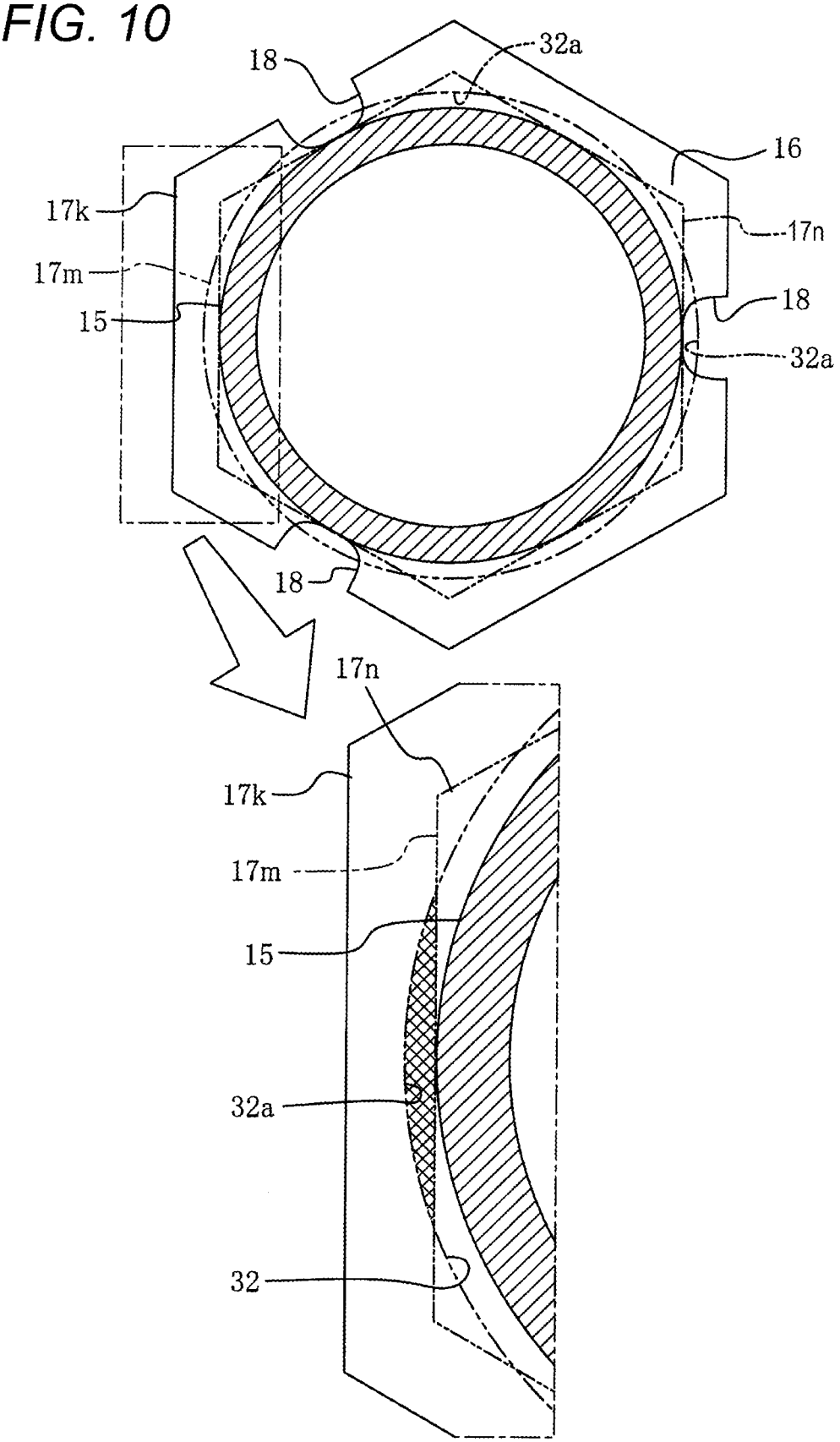
FIG. 10 shows an explanatory sectional view and a partially enlarged view of a modified example of a sensor of the invention, the explanatory sectional view illustrating a cross-sectional shape of a large-diameter portion of a tube and flow paths or openings which are taken along a location corresponding to the location S3-S3 in FIG. 9 along which the sectional view is taken.

Additionally, in the invention, since the "flow path (opening)" may be such as to allow the melted brazing filler to flow into the gap, as in a polygonal large-diameter tubular portion 17m indicated by chain double-dashed lines in FIG. 10, when an opening (flow path) which is indicated as being double hatched in FIG. 10 is formed by making a diagonal dimension larger than an inside diameter of a tube insertion hole 32 and making a dimension between opposite sides of the larger-diameter tubular portion 17m smaller than the inside diameter of the tube insertion hole 32, the opening can be used as a flow path. This is a flow path through which a melted brazing filler can flow into the above-described gap without forming depressed grooves by depressing either one or both of the large-diameter tubular portion 17m and the tube insertion hole 32 in a similar manner to that described in the previous embodiments. Namely, in this embodiment, when a small-diameter tubular portion 15 is inserted into the tube insertion hole 32 in a loose fit fashion, the large-diameter tubular portion 17m is locked on a rear end of the tube insertion hole 32 at corners or locations 17n near the corners on a front end facing surface of the large-diameter tubular portion 17m in a cross section of a front end of the large-diameter tubular portion 17m, whereby the tube is positioned in a front-to-rear direction with respect to the annular mounting fixture. Then, a melted brazing filler is allowed to flow into a gap defined between an inner circumferential surface 32a of the tube insertion hole 32 and an outer circumferential surface of the small-diameter tubular portion 15 via portions (the double hatched portion in FIG. 10) defined between the locations 17n near the corners of the polygonal shape.

As described above, in the sensor of the invention, the "flow path or opening" can be altered to be embodied as required according to the cross-sectional shape of the large-diameter tubular portion of the tube. Additionally, in the embodiments, the metallic tube which is closed at the front end thereof is described as being formed integrally into a unit. However, a composite construction may be adopted in which a front end of a tube is closed with a cap or a front end is fitted on or welded to the tube. Further, in the embodiments, the tube is described as having an increased diameter in five stages from the front end to the rear end thereof, and the small-diameter tubular portion and the large-diameter tubular portion are described as being embodied at the tubular portions at the last two stages. However, the tube of the sensor of the invention is not limited to the tube constructed to have different diameters. As understood from the configuration thereof, the tube may only have to include at least the small-diameter tubular portion and the large-diameter tubular portion. Namely, the tube of the sensor of the invention can be embodied based on a construction in which in such a state that the relative small-diameter tubular portion is inserted in the tube insertion hole in the annular mounting fixture in a loose fit fashion, the front end of the relative large-diameter tubular portion of the tube is locked on the rear end of the tube insertion hole, whereby the tube is positioned in the front-to-rear direction.

Further, as to the annular mounting fixture, in the embodiments, the annular mounting fixture is described as the member (the hollow bolt-like member, which will also be referred to as a hollow bolt hereinafter) having the thread which is the means for mounting itself on the mounting target location (for example, the exhaust manifold of the motor vehicle). However, a construction may be adopted in which an annular mounting fixture is mounted on the mounting target location in combination with a separate threaded member.

Next, an embodiment will be described by reference to FIGS. 11 to 14 in which a sensor is constructed to be mounted on the mounting target location in combination with a separate threaded member like the one described above. However, when compared with the first embodiment, basically, this embodiment differs only in the shape and construction of an annular mounting fixture 131 from the first embodiment, and the other members (constituent parts) and portions are substantially the same as those of the first embodiment. Therefore, in this embodiment, the features that differ from those of the first embodiment will mainly be described. Like reference numerals will be given to members and portions which are like those of the first embodiment, and the description thereof will be omitted as warranted. This is also the case with additional embodiments described below. Namely, in a sensor 301 according to this embodiment, in place of the hollow bolt illustrated in the embodiments that have been described above, an annular member (a ring) is used which has no thread formed on an outer circumferential surface thereof for the annular mounting fixture 131. Then, the sensor 301 is screwed to be mounted on the mounting target location in combination with a threaded member (indicated by the chain double-dashed lines in FIG. 11) 831 which is separate from the annular member. More specifically, the threaded member 831, which is separate (a separate part) from the annular member, is fitted on a tube 11 which constitutes the sensor 301 from the rear thereof and is then screwed into a threaded hole 510 in a mounting target location (indicated by the chain double-dashed lines in FIG. 11) 500, so that the sensor 301 is mounted on the mounting target location 500.

Figure 11:
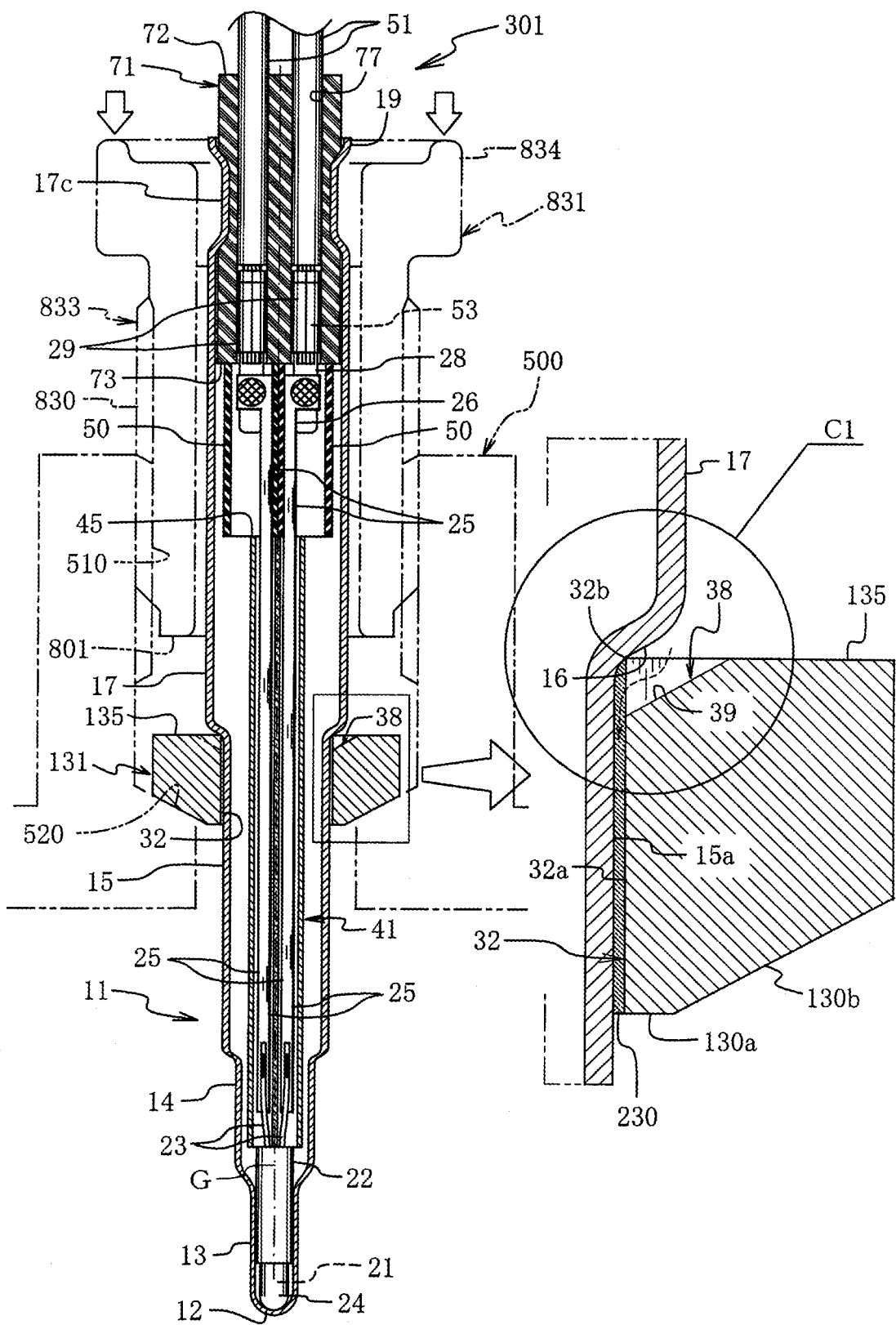
FIG. 11 shows a vertical sectional view of an embodiment of a sensor of the invention using as an annular mounting fixture an annular member having no thread which fits into an internal thread formed on a threaded hole in a mounting target location and which has therein a longitudinally penetrating hollow portion which constitutes a tube insertion hole and an enlarged view of an essential part thereof.
Figure 12:
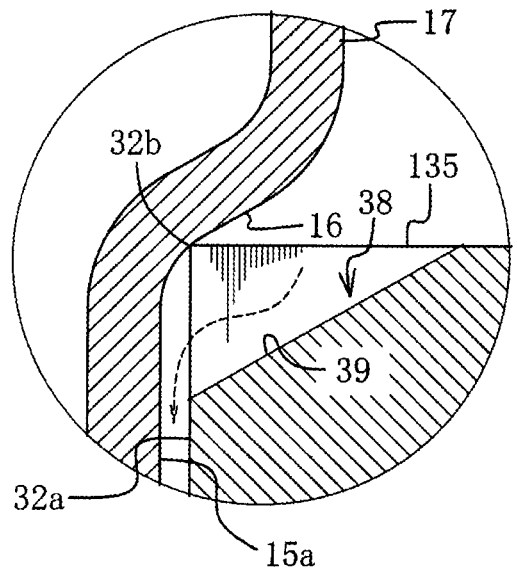
FIG. 12 is an enlarged view of a portion defined by a circle denoted by reference character C1 in FIG. 11.
Figure 13B:
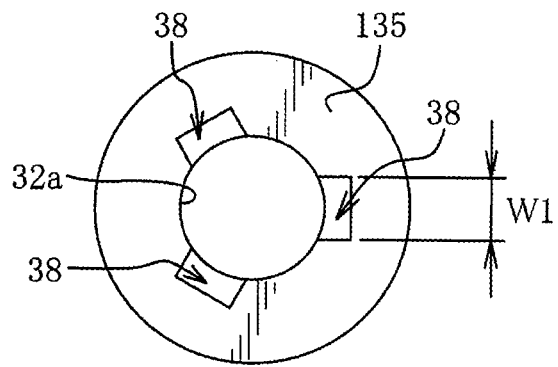
FIG. 13(B) is a plan view of the annular mounting fixture as seen from the rear end face side thereof.
Figure 13A:
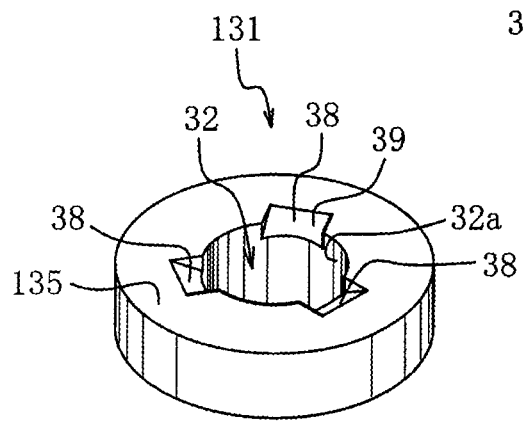
FIG. 13(A) is a perspective view of the annular mounting fixture as seen from a rear end face side thereof.
Figure 13C:
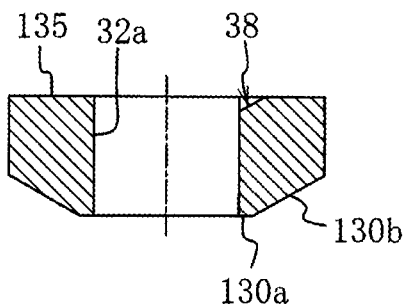
FIG. 13(C) is a sectional view of the annular mounting fixture taken along a horizontal center line of FIG. 13(B).

As shown in FIGS. 11 to 13, the annular mounting fixture 131 of the sensor 301 of this embodiment is an annular member (the circular ring) having a tube insertion hole 32 in an inside thereof. In this embodiment, the tube 11 has a small-diameter tubular portion 15 which is designed to be loosely fitted in the tube insertion hole 32 and a large-diameter tubular portion 17 which has an outside diameter larger than an inside diameter of the tube insertion hole 32 and which is disposed at the rear (or on top in FIG. 11) of the small-diameter tubular portion 15. The tube 11 is inserted into the tube insertion hole 32 in the annular mounting fixture 131 and is then brazed to the annular mounting fixture 131 in a manner similar to that described in the first embodiment shown in FIG. 1. Namely, an inner circumferential surface 32a of the tube insertion hole 32 and an outer circumferential surface 15a of the small-diameter tubular portion 15 are brazed together in such a state that the small-diameter tubular portion 15 of the tube 11 is inserted into the tube insertion hole 32 and a front end (a front end facing surface) 16 of the large-diameter tubular portion 17 is locked on a rear end 32b of the tube insertion hole 32.

The annular mounting fixture (the annular member) 131 of this embodiment assumes a short cylindrical (ring) shape having a trapezoidal vertical section as shown in FIG. 11. A portion of a front end of the annular mounting fixture 131 which lies near the inner circumferential surface 32a is formed into a flat front end face (an annular flat front end face) 130a which extends circularly along a circumferential direction, while a portion which lies near an outer circumferential edge is tapered towards the front end to form a seal holding surface when the sensor 301 is mounted accordingly. On the other hand, a rear end (an upper end in an enlarged view of FIG. 11) thereof is formed into a flat rear end face 135 in whole (refer to FIG. 13). Then, a corner which is formed by the rear end face 135 and the inner circumferential surface 32a of the tube insertion hole 32 (or where the rear end face 135 and the inner circumferential surface 32a intersect each other) is cut obliquely when seen in section as shown in FIG. 13 in a predetermined width W1 so as to form a flow path (an opening) 38 through which a melted brazing filler flows (refer to the enlarged view of FIG. 11). Namely, in this embodiment, the flow path 38 is formed by cutting the corner obliquely from the rear end face 135 towards the inner circumferential surface 32a of the tube insertion hole 32 so that a bottom portion 39 of the resulting flow path 38 constitutes a sloping surface (refer to FIGS. 11 and 12). It should be noted that the degree of inclination of the bottom portion 39 of the flow path 38 is substantially the same as the degree at which the front end facing surface (the front end) 16 of the large-diameter tubular portion 17 is tapered. Additionally, in this embodiment, three flow paths 38 are formed on the rear end face 135 at equal angular intervals along a circumferential direction of the tube insertion hole 32 (refer to FIG. 13B).

Thus, in this embodiment, too, the following function and advantage are obtained in the brazing step of brazing the tube 11 to the annular mounting fixture (the annular member) 131 in the production process of the sensor 301. Namely, when the small-diameter tubular portion 15 of the tube 11 is inserted into the tube insertion hole 32, the front end facing surface 16 which constitutes the front end of the large-diameter tubular portion 17 is brought into abutment with the rear end 32b of the tube insertion hole 32 (the ridge where the inner circumferential surface 32a of the tube insertion hole 32 intersects the rear end face 135) to be locked thereon (refer to FIG. 14). On the other hand, the flow paths 38 are formed on the annular mounting fixture (the annular member) 131 in the way described above. Because of this, in such a locked state, a rear end of a gap defined between the inner circumferential surface 32a of the tube insertion hole 32 and the outer circumferential surface 15a of the small-diameter tubular portion 15 of the tube 11 is not closed by the rear end 32b of the tube insertion hole 32 and the front end (the front end facing surface) 16 of the large-diameter tubular portion 17 (refer to the enlarged view of FIGS. 11 and 12). Namely, this embodiment also has a configuration in which a melted brazing filler can flow into the gap from the circumferential edge of the rear end 32b of the tube insertion hole 32 due to the flow paths 38.

Figure 14:
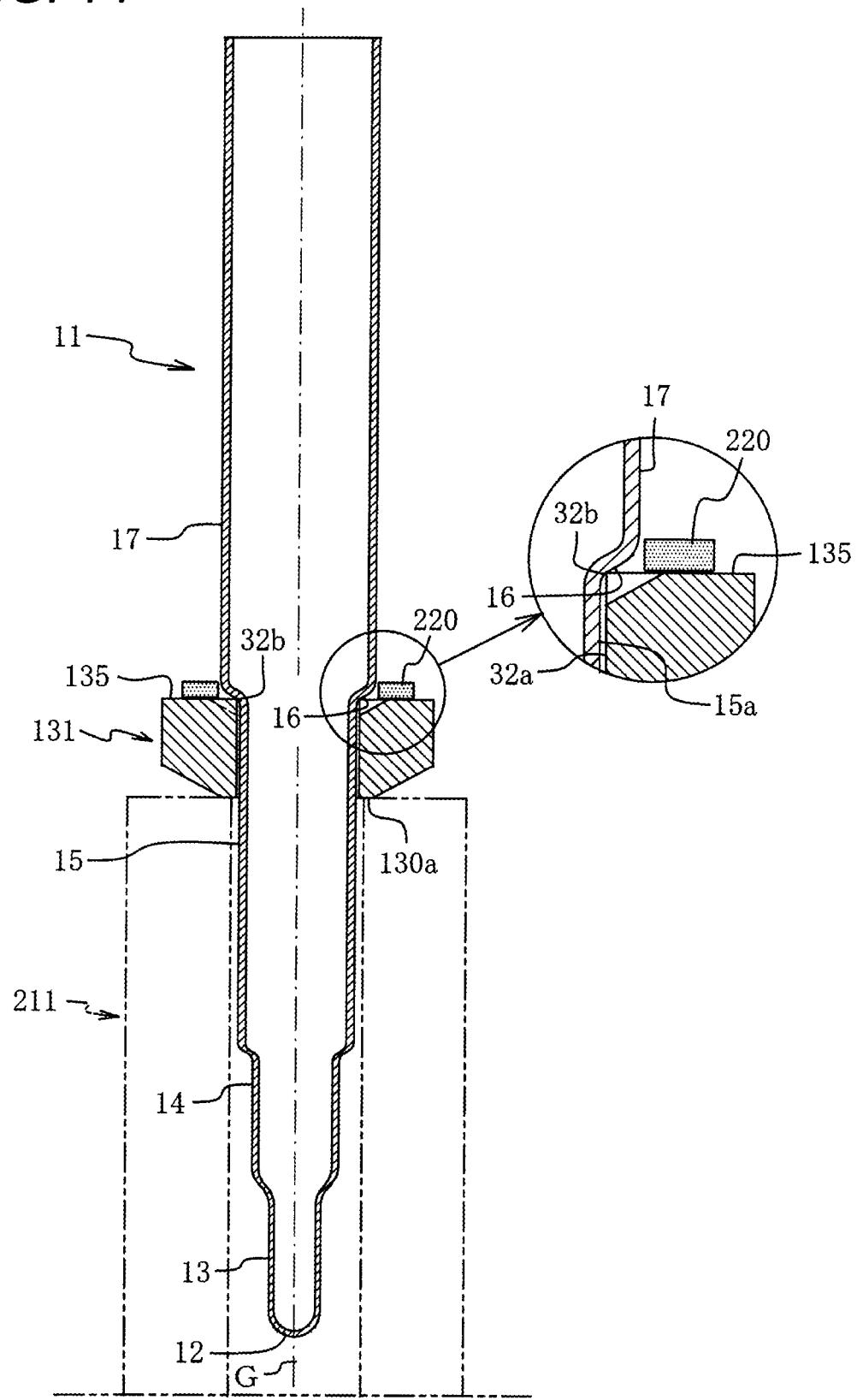
FIG. 14 shows an explanatory sectional view and an essential part enlarged sectional view which illustrate a step in a production process of the sensor shown in FIG. 11 where a tube is inserted into a tube insertion hole in the annular mounting fixture and is positioned in place therein for brazing, the explanatory sectional view illustrating a state in which the tube is inserted into the tube insertion hole in the annular mounting fixture which is supported on a support jig.

With this configuration, as shown in FIG. 14, the annular mounting fixture (the annular member) 131 is supported on a support jig 211 which is similar to those described in the above embodiments in such a state that the tube 11 is inserted into the tube insertion hole 32 in the annular mounting fixture (the annular member) 131. In this manner, the tube 11 is positioned in the front-to-rear direction with respect to the annular mounting fixture (the annular member) 131. As this occurs, the front end facing surface 16 of the large-diameter tubular portion 17 is locked on an inner circumferential edge of the rear end face 135 of the annular member 131 (the rear end 32b of the tube insertion hole 32), and a front end 12 of the tube 11 is made free (or constitutes a free end). Then, a predetermined brazing filler material 220 is disposed to be melted at a location on the rear end face 135 of the annular mounting fixture 131 which lies near the large-diameter tubular portion 17 in a similar manner to those described in the above embodiments. By so doing, the melted brazing filler passes through the flow path 38 as indicated by an arrow shown by a broken line in FIG. 12 at the circumferential edge of the rear end 32b of the tube insertion hole 32. The melted brazing filler then flows into the gap defined between the inner circumferential surface 32a of the tube insertion hole 32 and the outer circumferential surface 15a of the small-diameter tubular portion 15 by means of capillary action to wet both the inner and outer circumferential surfaces widely. Namely, even in the case of the annular mounting fixture (the annular member) 131 of this embodiment, the inner circumferential surface 32a and the outer circumferential surface 15a can be brazed together with the brazing filler 230 without any problem.

Then, by following steps similar to those described in the above embodiments, the sensor 301 of this embodiment is obtained. Thus, in the sensor of this invention, the annular mounting fixtures can be used as required whether or not they are threaded or irrespective of their shapes. In addition, the same advantages as those given by the sensors of the embodiments described above is obtained by using any of the annular mounting fixtures of the different shapes and constructions. Additionally, when the sensor 301 of this embodiment shown in FIG. 11 is mounted in the threaded hole 510 in the mounting target location 500 indicated by chain double-dashed lines in FIG. 11, the tube 11 is disposed so that the location thereof where the annular mounting fixture 131 resides is placed on a sitting surface (a tapered seat surface) 520 lying deep in the threaded hole 510. Along with this, the separate threaded member (hereinafter, referred to as a hollow bolt) 831 which exhibits a hollow bolt-like shape indicated by chain double-dashed lines in FIG. 11 is fitted rotatably on the tube 11 from the rear thereof and the separate threaded member 831 is screwed into the threaded hole 510. By so doing, the annular mounting fixture (the annular member) 131 is pressed forwards by a front end 801 of the hollow bolt 831, whereby the seal holding surface 130b which is tapered towards the front end at the front end of the annular mounting fixture 131 is pressed against the sitting surface 520 lying deep in the threaded hole 510 so as to hold the seal, the sensor 301 being mounted in the mounting target location. As described above, in the case of the sensor 301 being mounted by means of the screwing approach using the separate threaded member (the hollow bolt) 831, the sensor itself including lead wires 51 does not have to be rotated, and accordingly, the screwing work becomes simple.

The annular mounting fixture 131 of the sensor 301 of this embodiment also functions as a flange (a seal flange) for holding seal when the sensor 301 is mounted accordingly. The hollow bolt 831 has a basic configuration which is the same as that of the annular mounting fixture 31 shown in FIGS. 1 and 3. Namely, the hollow bolt 831 has a thread 830 which fits into an internal thread formed on the threaded hole 510 in the mounting target location 500 on an outer circumferential surface of an annular portion (a cylindrical portion) 833. The hollow bolt 831 also has a screwing tool engagement portion (a polygonal portion) 834 at the rear (rear end) of the annular portion 833. A hollow portion (a portion corresponding to the tube insertion hole) is a cylindrical hole having a size (diameter) which enables the hollow bolt 831 to be fitted rotatably on the tube 11 from the rear thereof.

Additionally, in the sensor 301 of this embodiment, when compared with the tube of the first embodiment, the configuration of the tube 11 is also slightly different therefrom due to the construction in which the sensor 301 is screwed to be mounted by utilizing the hollow bolt 831 which is the separate member as described above. Namely, the tube 11 of the sensor 301 of this embodiment slightly differs from the tube of the first embodiment in that a near-front-end straight tubular portion 14 is short and the small-diameter tubular portion 15 which is disposed at the rear of the near-front-end tubular portion 14 extends longer towards the front end side. Additionally, pipes 50 which are made of heat resistant hard resin (for example, PTFE or polytetrafluoroethylene) and which surround portions which include terminal fixtures 28 which connect together front ends 53 of lead wires 51 and rear ends 26 of core wires 25 are disposed while being compressed between a rear end 45 of an insulator tube 41 and a front end 73 of a seal member 71. By adopting this configuration, electrical insulation is ensured between the lead wires 51, and the insulator tube 41 is held pressed (compressed) towards the front end.

Figure 15:
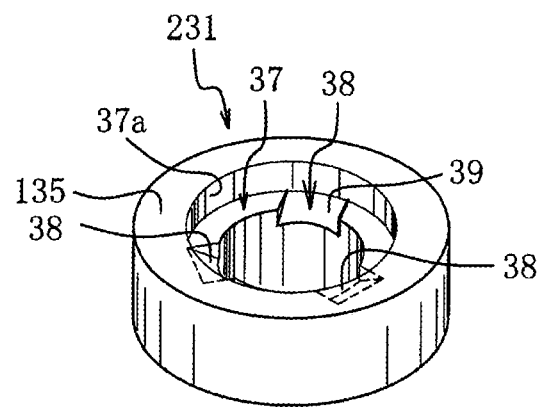
FIG. 15 is a perspective view of a modified example of an annular mounting fixture as a part constituting the sensor shown in FIG. 11, as seen from a rear end face side thereof.
Figure 16:
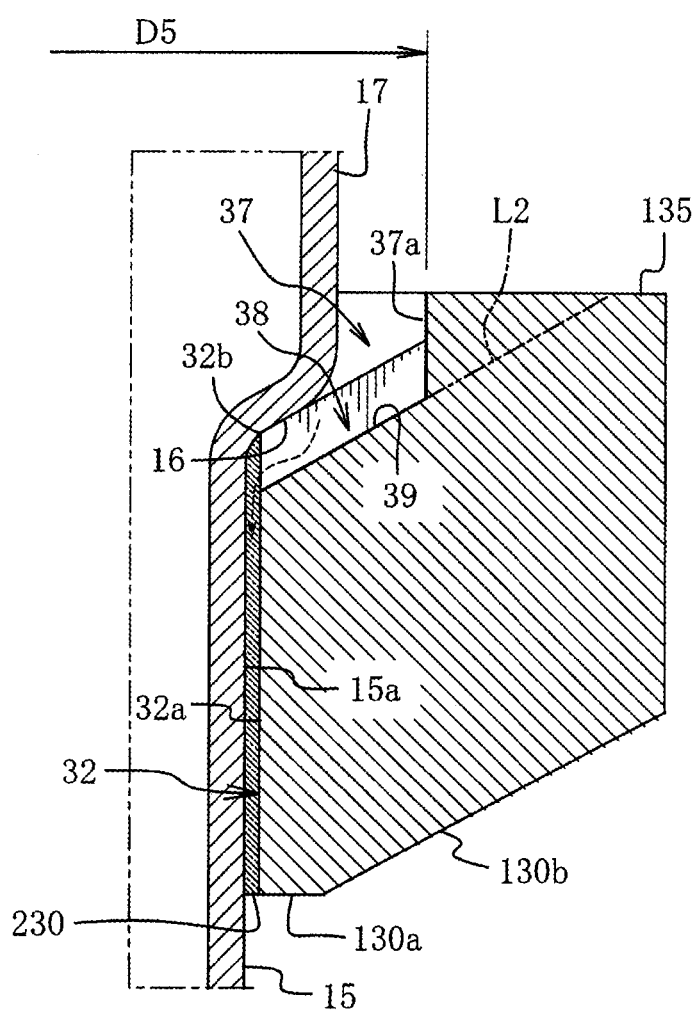
FIG. 16 is an essential part enlarged sectional view of the sensor which utilizes the annular mounting fixture shown in FIG. 15.

As in this embodiment, in the case of using an annular member having no thread as the annular mounting fixture 131, the shape and construction of the annular mounting fixture and the flow path (the opening) through which a melted brazing filler flows may also be altered as required as in the embodiments that have been described by reference to FIGS. 1 to 10. FIGS. 15 and 16 show a modified example of an annular mounting fixture and a state in which brazing is executed by use of the modified annular mounting fixture, respectively. Namely, as shown in FIG. 16, in the annular mounting fixture 231, an annular depressed portion 37 having an inside diameter D5 which is larger than an outside diameter of a large-diameter tubular portion 17 is provided on a rear end face 135 of the annular mounting fixture 231 at a location lying near a tube insertion hole 32 so as to receive a front end facing surface 16 of the large-diameter tubular portion 17 as in the first embodiment. Then, a flow path 38 is provided at a bottom portion of the depressed portion 37 by depressing (cutting) the bottom portion so that a resulting bottom portion 39 of the flow path 38 slopes down towards a tube insertion hole 32 at the same gradient as that at which the bottom portion of the depressed portion 37 slopes down.

In this annular mounting fixture 231, the annular depressed portion 37 receives a front end of the large-diameter tubular portion 17 in a loose fit fashion, and the front end facing surface (the annular surface) 16 the large-diameter tubular portion 17 is locked on the bottom portion (the annular step) of the depressed portion 37 in a seated fashion. As this occurs, due to the configuration described above, a gap between an inner circumferential surface 32a of the tube insertion hole 32 and an outer circumferential surface 15a of a small-diameter tubular portion 15 communicates with a rear end face 135 of the annular mounting fixture 231. Namely, the gap communicates with a space inside an inner circumferential surface 37a of the annular depressed portion 37 via three flow paths 38 cut to be formed on the bottom portion of the depressed portion 37. By adopting this configuration, also in this embodiment, in a brazing step of brazing the gap, a melted brazing filler flows into the flow paths 38 using the depressed portion 37 as a trough as in the embodiments described above and then continues to flow into the gap between the inner circumferential surface 32a of the tube insertion hole 32 and the outer circumferential surface 15a of the small-diameter tubular portion 15 via the flow paths 38 to thereby braze both of the circumferential surfaces together. Additionally, the annular depressed portion 37 also can function as a brazing filler reservoir. In addition, the flow paths 38 may be formed into an appropriate shape by cutting the bottom portion of the depressed portion 37 from the outside thereof at the rear end face 135 of the annular mounting fixture 231 as indicated by a chain double-dashed line (L2) in FIG. 16 (as in FIG. 1).

Figure 17B:
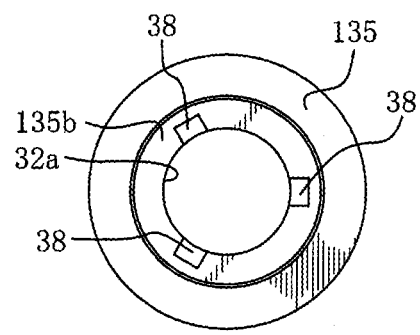
FIG. 17(B) is a plan view of the annular mounting fixture as seen from the rear end face side thereof.
Figure 17A:
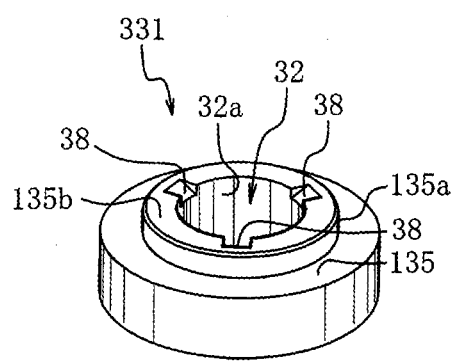
FIG. 17(A) is a perspective view of the annular mounting fixture as seen from a rear end face side thereof.
Figure 17C:
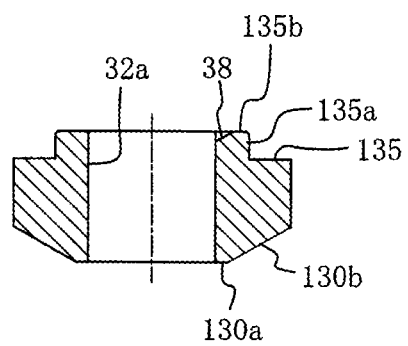
FIG. 17(C) is a sectional view of the annular mounting fixture taken along a horizontal center line.
Figure 18:
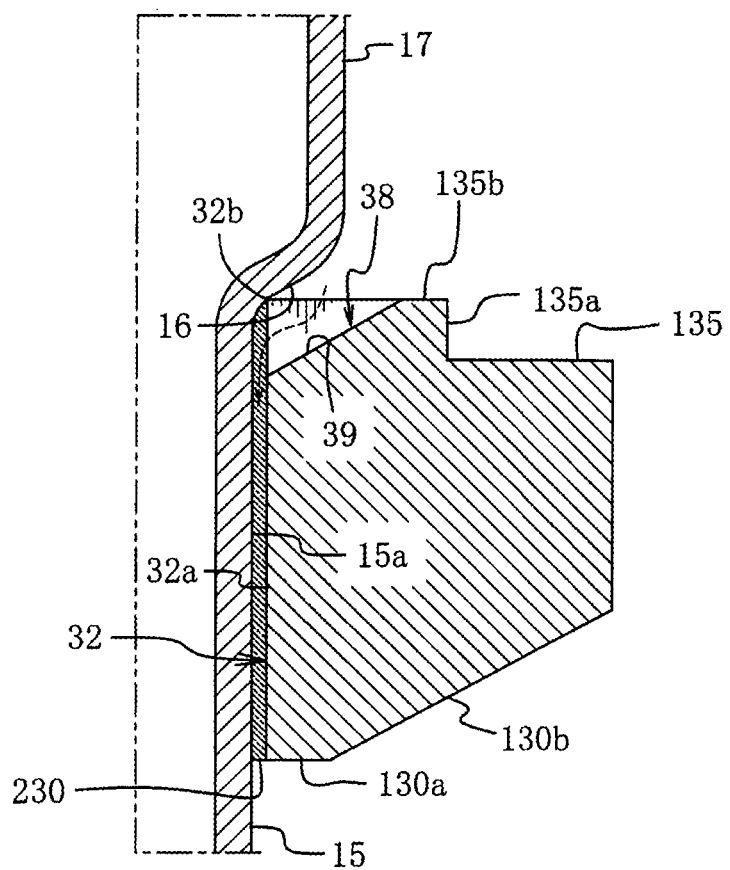
FIG. 18 is an essential part enlarged sectional view of the sensor which utilizes the annular mounting fixture shown in FIG. 17.
Figure 19:
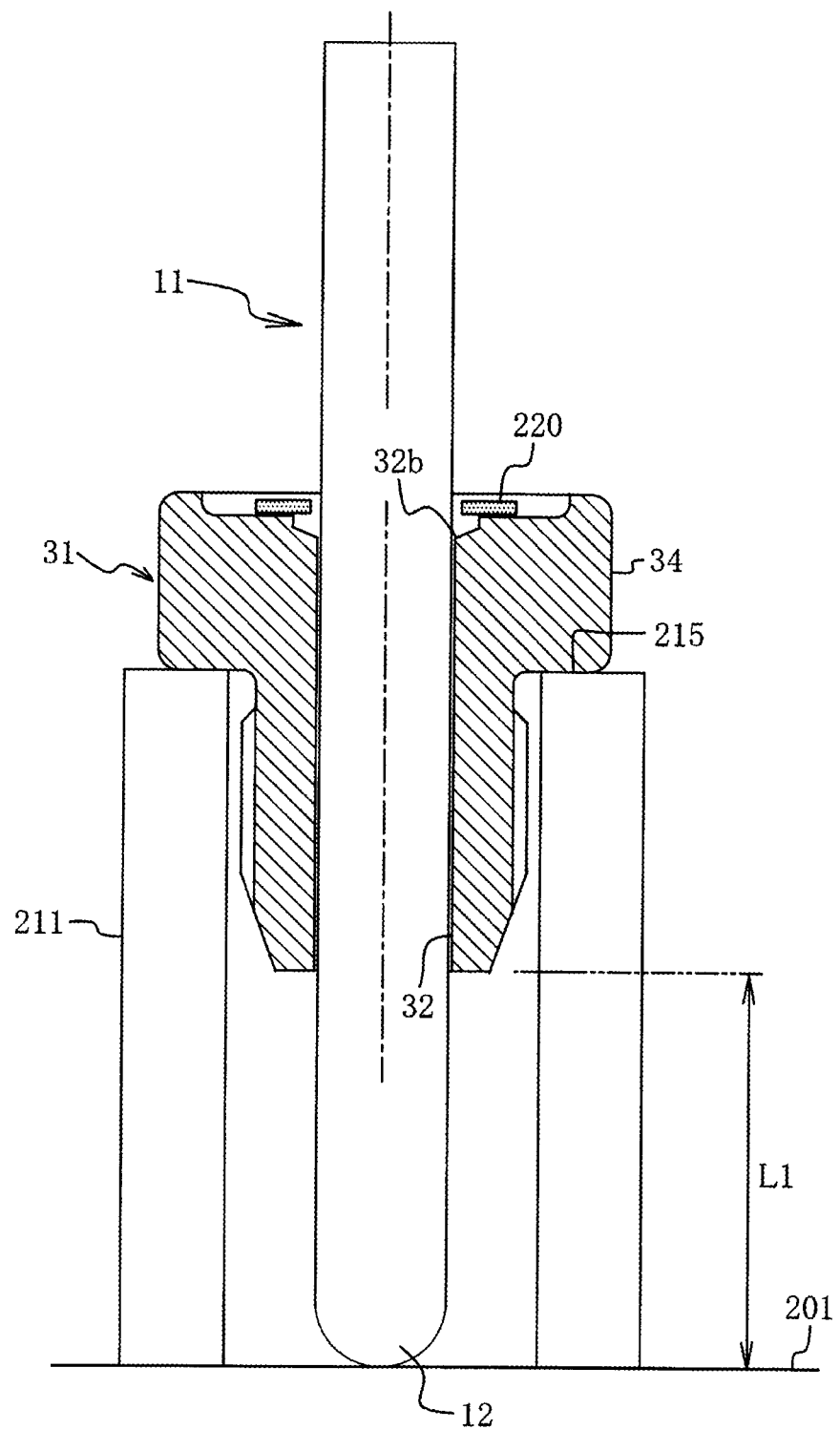
FIG. 19 is a vertical sectional view illustrating a problem caused in inserting a tube in a tube insertion hole in an annular mounting fixture which constitutes a conventional sensor, positioning the tube in place therein and brazing the tube to the annular mounting fixture.
Figure 20:
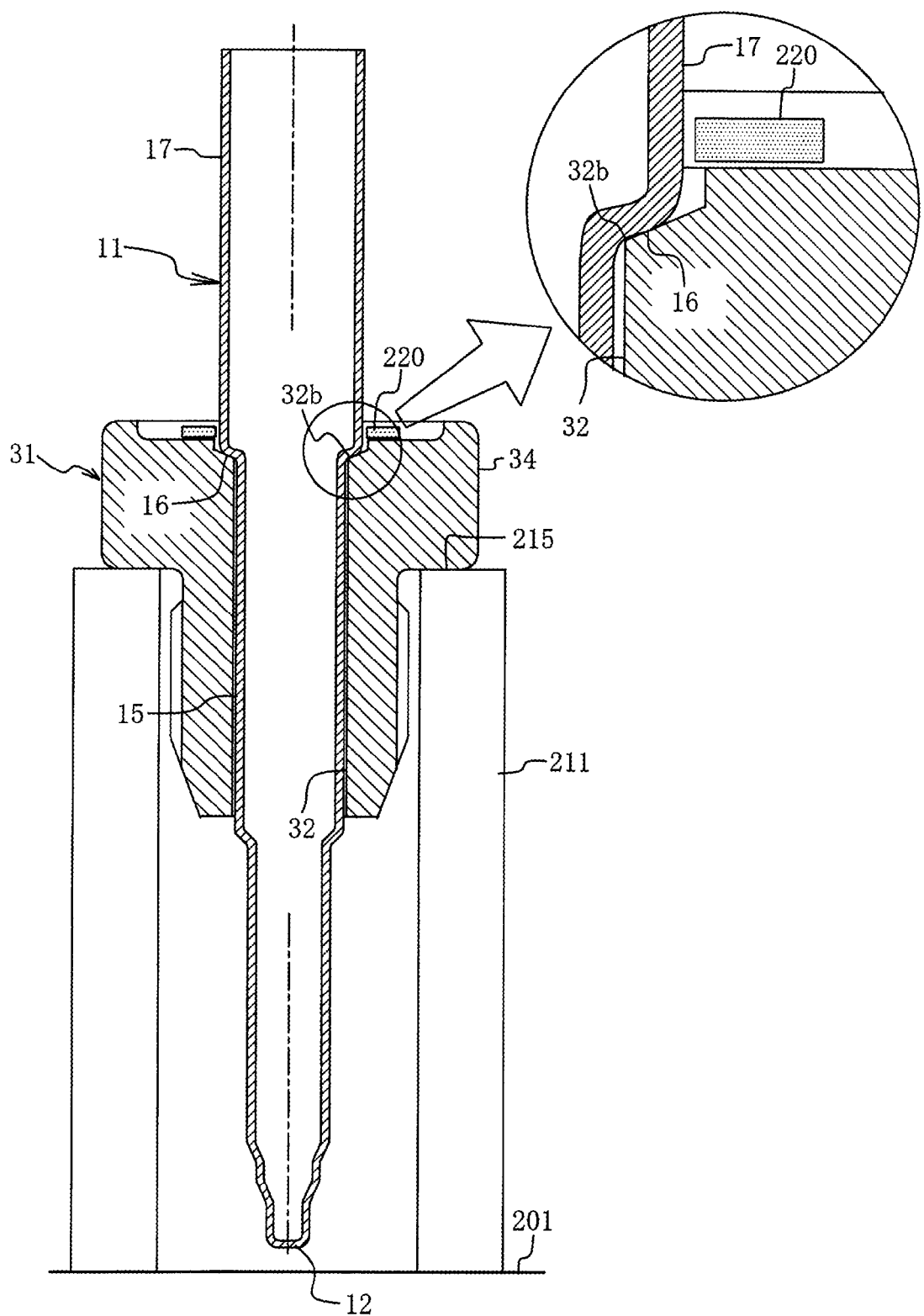
FIG. 20 is a vertical sectional view illustrating a problem caused in inserting a tube having a small-diameter tubular portion and a large-diameter tubular portion into a tube insertion hole in the annular mounting fixture, positioning the tube in a front-to-rear direction by causing a front end of the large-diameter tubular portion to be locked at a rear end of the tube insertion hole and brazing the tube to the annular mounting fixture.

Further, in this embodiment, the annular mounting fixture can be embodied into various annular mounting fixtures of appropriate shapes and configurations like an annular mounting fixture 331 shown in FIG. 17. For example, in the annular mounting fixture 131, a portion on the rear end face 135 which lies near an outer circumferential edge thereof is formed so as to be lower in height than a portion lying near a tube insertion hole 32. In this manner, the portion lying near the tube insertion hole 32 is raised relative to the outer circumferential edge of the rear end face 135. Namely, in the annular mounting fixture 331 shown in FIG. 17, the portion lying near the tube insertion hole 32 is raised in a predetermined width in a radial direction so as to be formed into the shape of a ring which extends circularly in a circumferential direction to thereby form a raised portion 135a. Then, as done in the embodiment shown in FIG. 11, a corner formed by a rear end face 135b of the annular projecting portion which is constituted by the raised portion 135 and the tube insertion hole 32 is cut obliquely in a predetermined width so as to provide a flow path (an opening) 38 through which a melted brazing filler flows. Namely, in this annular mounting fixture 331, as shown in a partially enlarged view of FIG. 18 which depicts a state in which a small-diameter tubular portion 15 of a tube 11 is inserted in the tube insertion hole 32 to be brazed thereto, a front end facing surface 16 of a large-diameter tubular portion 17 is supported on the corner formed by the rear end face 135b of the raised portion 135a which makes a rear end of the annular mounting fixture 331 and the inner circumferential surface 32a of the tube insertion hole 32. In this embodiment, when the hollow bolt member (the separate threaded member 831 shown in FIG. 11) is used, the front end 801 preferably pushes the rear end face 135 which lies further radially outwards than the annular projecting portion which is the raised portion 135a towards the front end.

As described in the embodiments above, when the annular mounting fixtures 131, 231, 331 having no thread is used, as shown in FIG. 8, a flow path 18 may also be formed so as to be depressed rearwards at the front end (the front end facing surface 16) of the large-diameter tubular portion 17 of the tube 11 by depressing the large-diameter tubular portion 17 in a predetermined width W2 and depth H2 from the outer side (the outer circumferential surface) of the large-diameter tubular portion 17 towards the center of the tube 11. As this occurs, a flow path (or an opening) 38 may also be provided at the rear end of the tube insertion hole in the annular mounting fixture by making a cut in the manner described in the embodiments. Thus, the flow paths (or the openings) may be provided both at the rear end face of the annular mounting fixture and the front end (the front end facing surface 16) of the large-diameter tubular portion 17. However, a flow path need not be provided at the rear end of the tube insertion hole in the annular mounting fixture. This is because in this invention, the flow path or the opening should be formed between the rear end of the tube insertion hole and the front end of the large-diameter tubular portion so that the melted brazing filler can flow into the gap between the inner circumferential surface of the tube insertion hole and the outer circumferential surface of the small-diameter tubular portion from the circumferential edge of the tube insertion hole.

Namely, the annular mounting fixture which constitutes the sensor of the invention can be used irrespective whether or not it has the mounting thread, and can be embodied or applied irrespective of the shape and construction of the annular mounting fixture. In addition, as described above, when the annular depressed groove is formed on the rear end face of the annular mounting fixture along the inner circumference of the tube insertion hole, the annular depressed groove thus formed also functions as the brazing filler reservoir, and the advantage of having the brazing filler reservoir is obtained. However, this is not an essential feature of the invention. The sensor of the invention is not limited to the use for measuring the temperature of exhaust gas and hence can widely be applied to sensors for other applications.

The invention has been described in detail with reference to the above embodiments. However, the invention should not be construed as being limited thereto. It should further be apparent to those skilled in the art that various changes in form and detail of the invention as shown and described above may be made. It is intended that such changes be included within the spirit and scope of the claims appended hereto.

This application is based on Japanese Patent Application No. 2011-112250 filed May 19, 2011 and Japanese Patent Application No. 2012-012367 filed Jan. 24, 2012, the disclosures of which are incorporated herein by reference in its entirety.

What is claimed is:

1. A sensor comprising an annular mounting fixture and a tube which is inserted into a tube insertion hole of the annular mounting fixture in a loose fit fashion, a gap between an inner circumferential surface of the tube insertion hole and an outer circumferential surface of the tube is brazed so as to maintain a seal in a front-to-rear direction of the sensor, and a sensor element is provided at a front end portion in an interior of the tube, wherein the tube comprises a small-diameter tubular portion which is inserted into the tube insertion hole in a loose fit fashion and a large-diameter tubular portion which is disposed at the rear of the small-diameter tubular portion and which has a diameter larger than an inside diameter of the tube insertion hole, wherein a flow path is formed between a rear end of the tube insertion hole and a front end of the large-diameter tubular portion, so that when the tube is inserted into the tube insertion hole and the front end of the large-diameter tubular portion of the tube is locked on the rear end of the tube insertion hole, a rear end of the gap, which is defined between an inner circumferential surface of the tube insertion hole and an outer circumferential surface of the small-diameter tubular portion of the tube, is not closed by the rear end of the tube insertion hole and the front end of the large-diameter tubular portion, and so that a melted brazing filler can flow into the gap from a circumferential edge of the rear end of the tube insertion hole, and wherein the inner circumferential surface of the tube insertion hole and the outer circumferential surface of the small-diameter tubular portion of the tube are brazed together with the brazing filler which flows into the gap after having flowed through the flow path from the circumferential edge of the rear end of the tube insertion hole.

2. The sensor as claimed in claim 1, wherein the flow path comprises an uneven portion provided on at least one of the rear end of the tube insertion hole and the front end of the large-diameter tubular portion.

3. The sensor as claimed in claim 1, wherein the flow path comprises a plurality of uneven portions provided along a circumferential direction on at least one of the rear end of the tube insertion hole and the front end of the large-diameter tubular portion.

4. The sensor as claimed in claim 1, wherein the sensor is a temperature sensor.

5. The sensor as claimed in claim 1, wherein the annular mounting fixture has a thread which fits into an internal thread formed on a threaded hole in a mounting target location for the sensor, has the shape of a hollow bolt having a hollow portion which penetrates therethrough to constitute the tube insertion hole, and has a screwing tool engagement portion at the rear of the thread.

6. The sensor as claimed in claim 1, wherein the annular mounting fixture is an annular member not having a thread which fits into an internal thread formed on a threaded hole in a mounting target location for the sensor itself and has therein a hollow portion which penetrates therethrough to constitute the tube insertion hole.

7. The sensor as claimed in claim 6, wherein the annular member is pressed by a hollow bolt member having a thread which fits into the internal thread formed on the threaded hole in the mounting target location for the sensor by fitting the hollow bolt member on the tube from the rear thereof and screwing the hollow bolt member into the threaded hole so that the thread on the hollow bolt member fits into the internal thread on the threaded hole, and functions as a flange which is pressed against a sitting surface lying deep in the threaded hole by the pressing action to thereby maintain a seal.

8. The sensor as claimed in claim 7, wherein the annular member has on a front end face thereof a seal holding surface which is tapered so as to be pressed against the sitting surface lying deep in the threaded hole to thereby maintain a seal.

* * * * *